US012725123B2

(12) United States Patent
Lee et al.

(10) Patent No.: US 12,725,123 B2
(45) Date of Patent: Sep. 1, 2026

(54) SYSTEM AND METHOD FOR RISK-MITIGATED REPURCHASE OF DIGITAL COLLECTIBLE AGGREGATES

(71) Applicant: Arena Club, Inc., Los Angeles, CA (US)

(72) Inventors: Brian Lee, Los Angeles, CA (US); Vartul Agrawal, Los Angeles, CA (US); Jesse Glass, Santa Monica, CA (US)

(73) Assignee: ARENA CLUB, INC., Los Angeles, CA (US)

( * ) Notice: Subject to any disclaimer, the term of this patent is extended or adjusted under 35 U.S.C. 154(b) by 0 days.

(21) Appl. No.: 19/309,688

(22) Filed: Aug. 26, 2025

(65) Prior Publication Data

US 2026/0073354 A1 Mar. 12, 2026

Related U.S. Application Data

(63) Continuation of application No. 19/224,610, filed on May 30, 2025, and a continuation of application No. (Continued)

(51) Int. Cl.
*G06Q 30/00* (2023.01)
*G06Q 10/087* (2023.01)
(Continued)

(52) U.S. Cl.
CPC ....... *G06Q 10/087* (2013.01); *G06Q 30/0185* (2013.01); *G06Q 30/0283* (2013.01);
(Continued)

(58) Field of Classification Search
CPC ............ G06Q 10/087; G06Q 30/0185; G06Q 30/0283; G06Q 30/0611; G06Q 30/0641; H04L 9/50
(Continued)

(56) References Cited

U.S. PATENT DOCUMENTS

2012/0303411 A1* 11/2012 Chen ..................... G06Q 30/02 705/7.31
2019/0244230 A1* 8/2019 Subramanian ..... G06Q 30/0206
(Continued)

FOREIGN PATENT DOCUMENTS

KR 20250106970 A * 7/2025 ......... G06Q 30/0202

*Primary Examiner* — Russell S Glass
(74) *Attorney, Agent, or Firm* — Sheppard, Mullin, Richter & Hampton LLP

(57) ABSTRACT

A computer-implemented system for managing digital collectible transactions comprising a pack-value based repurchase architecture that provides guaranteed minimum returns based on original purchase price rather than volatile individual item valuations. The system implements a dual-transaction financial architecture wherein an initial purchase transaction through external payment gateways is followed by a separate repurchase transaction executed through an internal ledger system, providing immediate liquidity and regulatory advantages. Pack-level atomicity enforcement prevents fractured ownership by requiring all-or-nothing repurchase decisions for entire collectible item aggregates. Dynamic inventory management with real-time odds calculation and WebSocket-based communication provides transparent, synchronized user experiences across distributed client devices, addressing fundamental problems of financial risk, opacity, and liquidity in digital collectibles markets.

6 Claims, 14 Drawing Sheets

Related U.S. Application Data

19/191,173, filed on Apr. 28, 2025, now Pat. No. 12,536,501.

(60) Provisional application No. 63/691,449, filed on Sep. 6, 2024, provisional application No. 63/691,458, filed on Sep. 6, 2024.

(51) Int. Cl.

*G06Q 30/018* (2023.01)
*G06Q 30/0283* (2023.01)
*G06Q 30/0601* (2023.01)
*H04L 9/00* (2022.01)

(52) U.S. Cl.

CPC ..... *G06Q 30/0611* (2013.01); *G06Q 30/0641* (2013.01); *H04L 9/50* (2022.05)

(58) Field of Classification Search

USPC ........................................................... 705/28
See application file for complete search history.

(56) References Cited

U.S. PATENT DOCUMENTS

2022/0138784 A1* 5/2022 Laserson ............ G06Q 30/0603 705/7.35
2023/0298008 A1* 9/2023 Sarin ......................... H04L 9/50 705/69

* cited by examiner

SYSTEM AND METHOD FOR RISK-MITIGATED REPURCHASE OF DIGITAL COLLECTIBLE AGGREGATES

CROSS REFERENCE TO RELATED APPLICATIONS

This application claims the benefit of and priority to U.S. patent application Ser. No. 19/191,173, filed Apr. 28, 2025, titled "Enhanced Transparency and Consumer Engagement System for Trading Card Distribution," and U.S. patent application Ser. No. 19/224,610, filed May 30, 2025, titled "System for Repurchase of Collectibles," each of which is hereby incorporated by reference in its entirety. This application further claims the benefit of and priority to U.S. Provisional Patent Application No. 63/691,449, filed Sep. 6, 2024, and U.S. Provisional Patent Application No. 63/691,458, filed Sep. 6, 2024, each of which is hereby incorporated by reference in its entirety.

FIELD OF THE INVENTION

The present invention relates generally to computer-implemented systems and methods for managing digital collectible transactions with risk mitigation capabilities, and more particularly to systems that provide guaranteed value floors through pack-based repurchase architectures, dual-transaction financial processing, and real-time inventory transparency mechanisms. The invention addresses technical problems in networked computing environments specifically arising from the need to process complex multi-item digital asset transactions while maintaining transactional atomicity, providing immediate liquidity through ledger-based credit systems, and delivering synchronized real-time data updates across distributed client devices for transparent odds calculation and inventory management in digital collectibles marketplaces.

BACKGROUND OF THE INVENTION

The field of digital collectibles transactions presents several fundamental technical challenges that have historically limited consumer adoption and market growth. Digital collectibles platforms must process financial transactions for items with uncertain and fluctuating values, creating significant exposure to financial risk for consumers who may invest substantial amounts in speculative purchases without adequate protection mechanisms.

Traditional transaction processing systems encounter substantial complexity when implementing buyback or repurchase functionalities. Conventional approaches often rely on net-settlement methodologies that blur the lines between initial sales and subsequent repurchases, creating ambiguities in accounting procedures and regulatory compliance. These systems typically lack the architectural separation necessary to provide clear audit trails and simplified financial reporting while maintaining immediate liquidity for users.

Multi-item digital packages present unique challenges in maintaining transactional integrity. Systems permitting fractured ownership of package contents must implement complex database schemas to track partial selections and individual item valuations, leading to technical complications in inventory management and user experience inconsistencies. The computational overhead and architectural complexity associated with managing individual item selections within package contexts creates performance implications and increases system maintenance requirements.

Inventory management in dynamic digital environments requires real-time synchronization of availability data and probability calculations across distributed client interfaces. Traditional static display approaches fail to maintain mathematical accuracy when inventory levels change, while polling-based communication systems introduce latency issues that compromise the immediacy necessary for engaging user experiences. The challenge of maintaining transparent and current information regarding item availability and acquisition probabilities while preserving system performance represents a significant technical hurdle.

These technical problems collectively create barriers to establishing consumer trust and confidence in digital collectibles platforms, limiting the potential for sustainable market growth and widespread adoption of digital asset transaction systems.

SUMMARY OF THE INVENTION

In accordance with an embodiment of the invention, the problems of financial risk exposure and accounting complexity in digital collectibles transactions are solved by implementing a pack-value based repurchase system that provides guaranteed minimum returns calculated from the original purchase price rather than volatile individual item valuations. This approach fundamentally transforms speculative collectible purchases into insured transactions by establishing a predictable value floor that protects consumers from catastrophic losses while maintaining program sustainability.

The system implements a novel dual-transaction financial architecture comprising two distinct and separate financial events: an initial purchase transaction processed through external payment gateways and a completely separate repurchase transaction executed through an internal ledger-based credit system. This architectural separation provides immediate liquidity to users upon offer acceptance while maintaining proper accounting boundaries and regulatory compliance advantages over conventional net-settlement approaches that blur the lines between purchase and repurchase events.

In accordance with a preferred embodiment, the system calculates repurchase offers using the formula: $offerPrice=max(0.8\times packPrice, 0.9\times aggregateEV)$, where the guaranteed minimum component ensures users receive at least 80% of their original pack purchase price regardless of individual card market fluctuations. When users opt into premium protection during initial checkout by paying an additional percentage of the pack price, the guaranteed minimum percentage increases accordingly, providing enhanced consumer protection for those who choose to invest in additional security.

The invention further addresses the technical complexities of fractured ownership in an embodiment by enforcing pack-level transactional atomicity through a multi-layered architecture that prevents individual card selection during repurchase operations. Database-level foreign key constraints link individual card records inextricably to their parent pack instances, while API endpoints and user interface controls structurally prevent partial pack transactions, ensuring that repurchase offers apply to complete pack contents as indivisible units.

The system provides superior transparency through real-time inventory management and dynamic odds calculation mechanisms that maintain a plurality of collectible items per series, and in one exemplary embodiment 100 collectible items per series, through automated replenishment. WebSocket-based communication channels deliver immediate updates of inventory changes and probability calculations to all connected client devices, enabling users to make informed purchasing decisions based on current, accurate information about their likelihood of acquiring specific items.

The time-limited offer presentation utilizes a configurable countdown timer implemented through React components and WebSocket technology in an exemplary embodiment, creating urgency while providing users sufficient time to evaluate their pack contents. Upon offer acceptance, the internal ledger system immediately posts withdrawable credits to user wallets, contrasting with competitor approaches that provide non-withdrawable platform currencies or delayed settlement mechanisms.

This solution addresses the fundamental market problems that have historically limited consumer adoption in digital collectibles by providing predictable financial protection, immediate liquidity, complete transparency, and simplified transaction processing that eliminates the need for users to navigate complex secondary markets or manage individual item sales.

DETAILED DESCRIPTION

The digital collectibles platform of the preferred embodiment implements a distributed system architecture designed to support real-time transaction processing, dynamic inventory management, and seamless user experiences across multiple client devices. As illustrated in the accompanying figures and supported by the foundational disclosures of the parent applications, the system comprises several interconnected components that work in concert to enable the novel pack-value based repurchase functionality and dual-transaction financial architecture that form the core of an embodiment of the invention.

Figure 1:
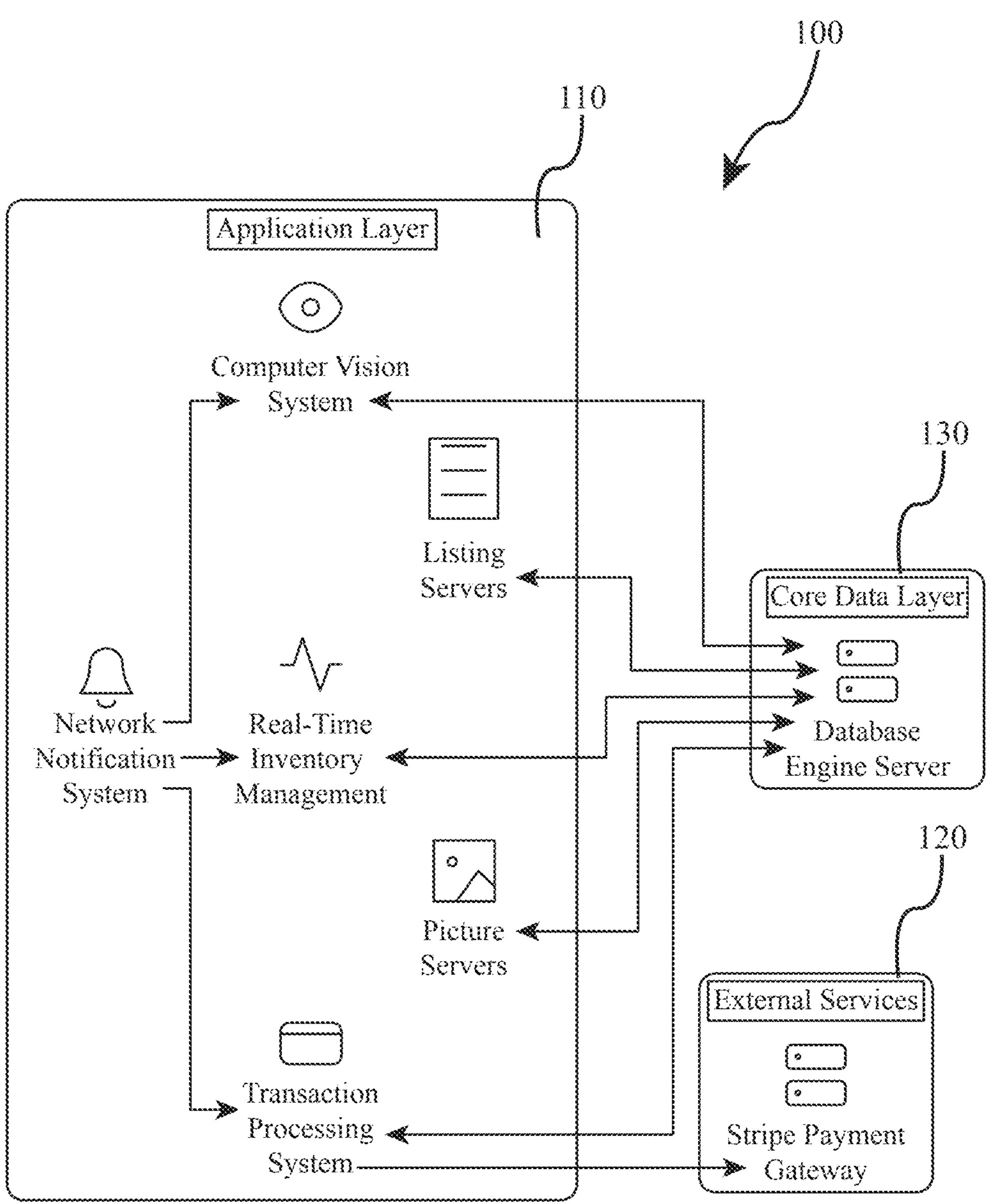
FIG. 1 depicts a system architecture overview in accordance with an embodiment, illustrating the distributed system architecture supporting the digital collectibles platform, including the database engine server, listing servers, picture servers, real-time inventory management system, computer vision system, transaction processing system, network-based notification system, and their interconnections via WebSocket connections and external payment gateway integration.

FIG. 1 illustrates the overall system architecture (100) of the digital collectibles platform in accordance with an embodiment of the invention. The system comprises an application layer (110) that interfaces with users through various client devices. The core data layer includes a database engine server (130) that serves as the central repository, interconnected with listing servers and picture servers that maintain digital representations of collectible items. A computer vision system connects to the picture servers to enable scanning and authentication of physical items in an embodiment. The real-time inventory management system coordinates with a transaction processing system, linked to external services (120) such as STRIPE, to handle purchase requests and the dual-transaction processing architecture. A network notification system establishes persistent bidirectional communication channels with client devices to transmit real-time updates. The system integrates with external services including the Stripe payment gateway for processing initial purchase transactions in the dual-transaction financial architecture.

Figure 2:
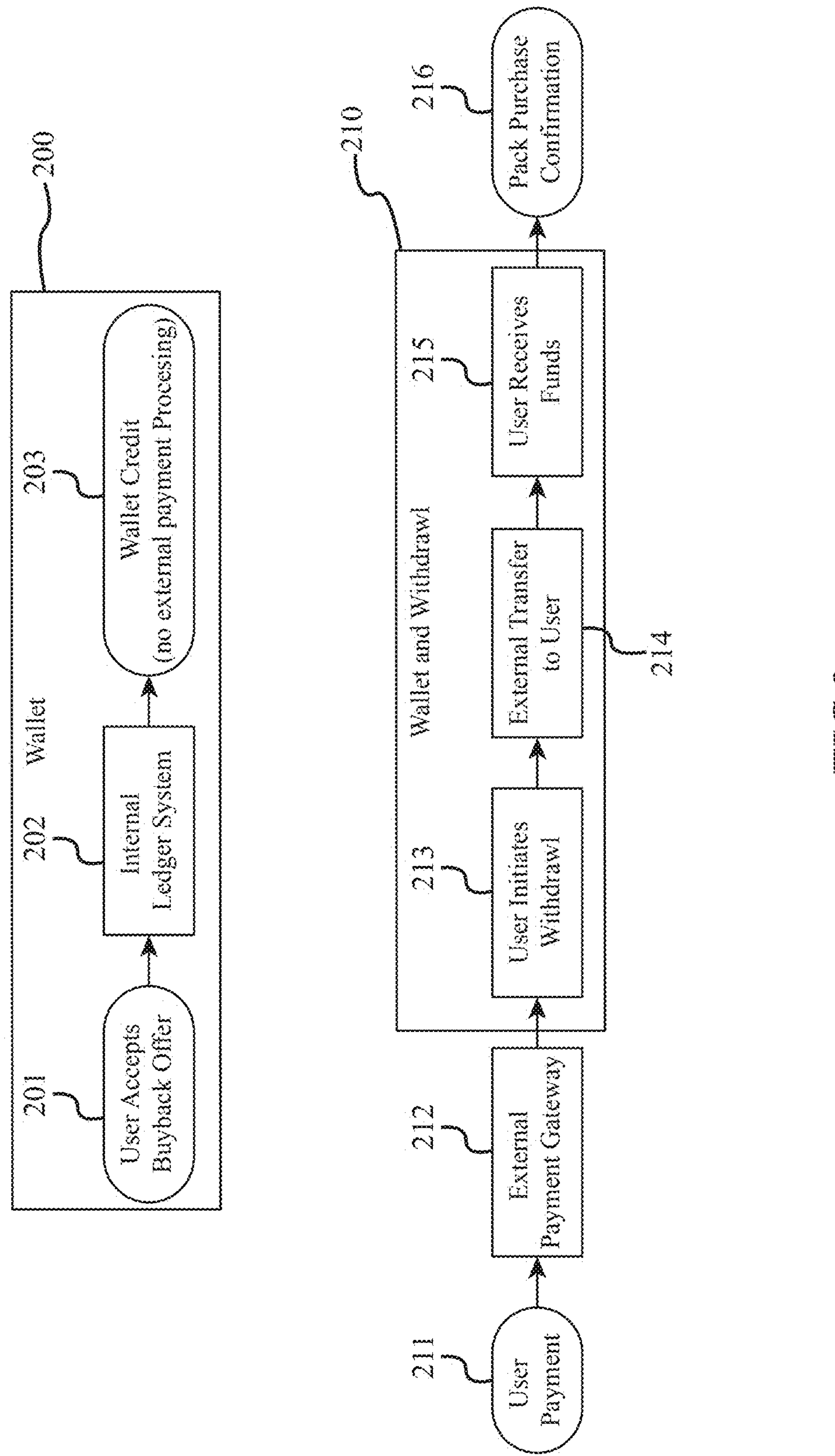
FIG. 2 depicts a dual-transaction financial architecture flow diagram in accordance with an exemplary embodiment, showing the separation between Transaction 1 (user payment through external payment gateway for pack purchase) and Transaction 2 (internal ledger system credit for buyback), including the timeline demonstrating the temporal separation between purchase and repurchase events, user wallet operations, and withdrawal processing.

FIG. 2 depicts the dual-transaction financial architecture flow in accordance with an embodiment, illustrating the separation between the first financial transaction and the second financial transaction. The process begins when a user provides payment (211) through an external payment gateway (212), resulting in pack purchase confirmation (216). When the user via a wallet (200) accepts a buyback offer (201), the system executes the second transaction through the internal ledger system (202), posting a wallet credit (203) without external payment processing (210). The user wallet (210) and withdrawal functionality (213) enables users to later initiate withdrawals (215), which trigger external transfers (214) back to the user through the payment gateway infrastructure, maintaining the architectural separation between internal ledger operations and external payment processing.

Figure 3A:
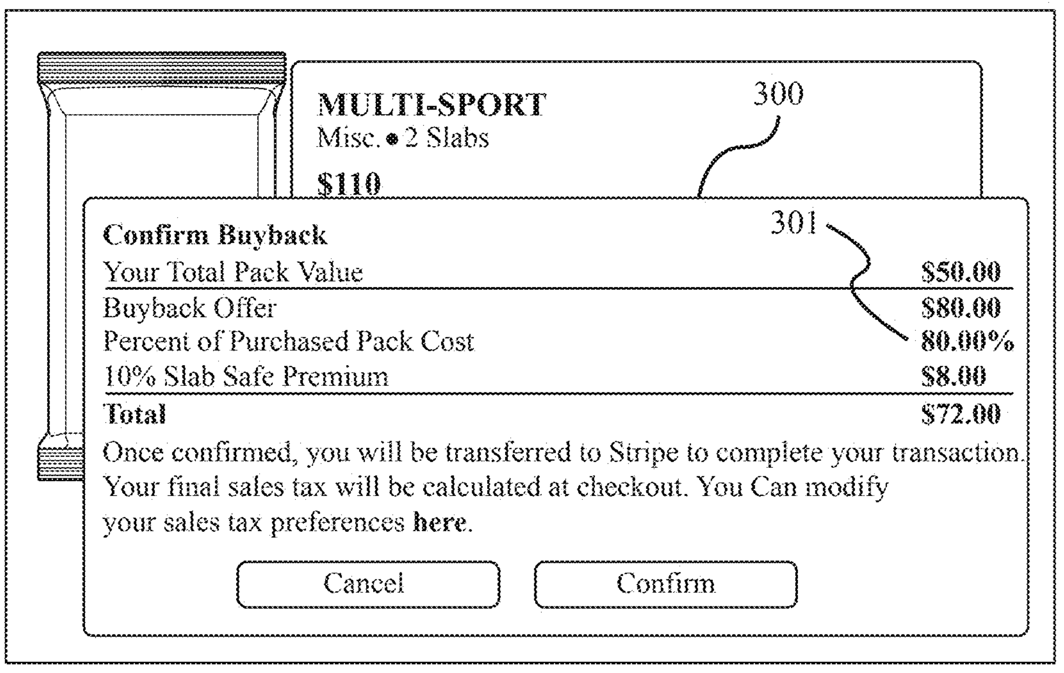
FIG. 3*a* depicts an exemplary embodiment of a user interface showing a pack-value based repurchase offer interface, and the buyback and repurchase premium adding an amount to the base offer.
Figure 3B:
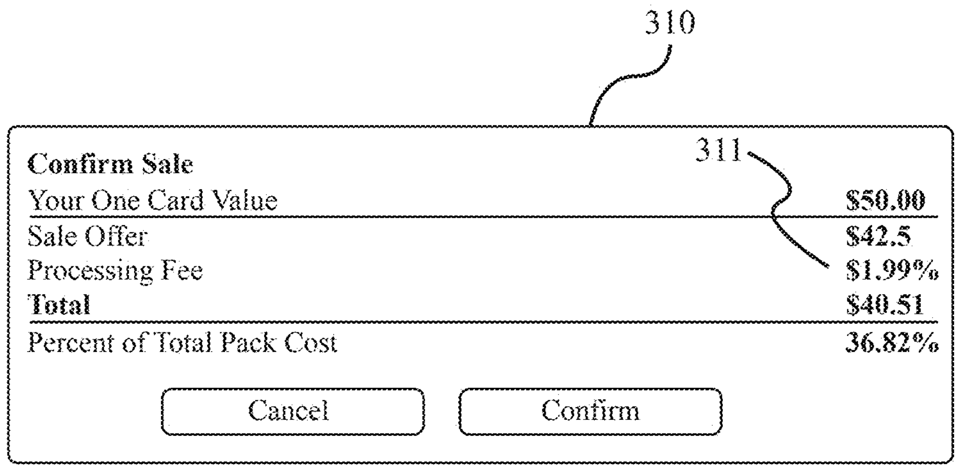
FIG. 3*b* depicts an exemplary embodiment of a user interface showing a comparative individual card-based sale interface with the confirm sale dialog and individual card sale interface elements, and Cancel and Confirm buttons.

FIG. 3*a* illustrates the pack-value based repurchase offer interface n accordance with an embodiment, displaying the buyback confirmation modal (300) that presents the user's total pack value, the calculated buyback offer based on the pack purchase price, and the percentage of the purchased pack cost (301). The interface shows the optional 10% Slab Safe premium and the total offer amount, demonstrating the pack-level atomicity where the entire plurality of collectible items must be repurchased as a single unit. FIG. 3*b* shows a comparative interface featuring a confirmation of sale (310) illustrating an individual card-based sale approach with the sale offer and processing fee (311) for contrast, highlighting the superior consumer protection provided by the pack-value methodology over individual card fair market value approaches.

Figure 4A:
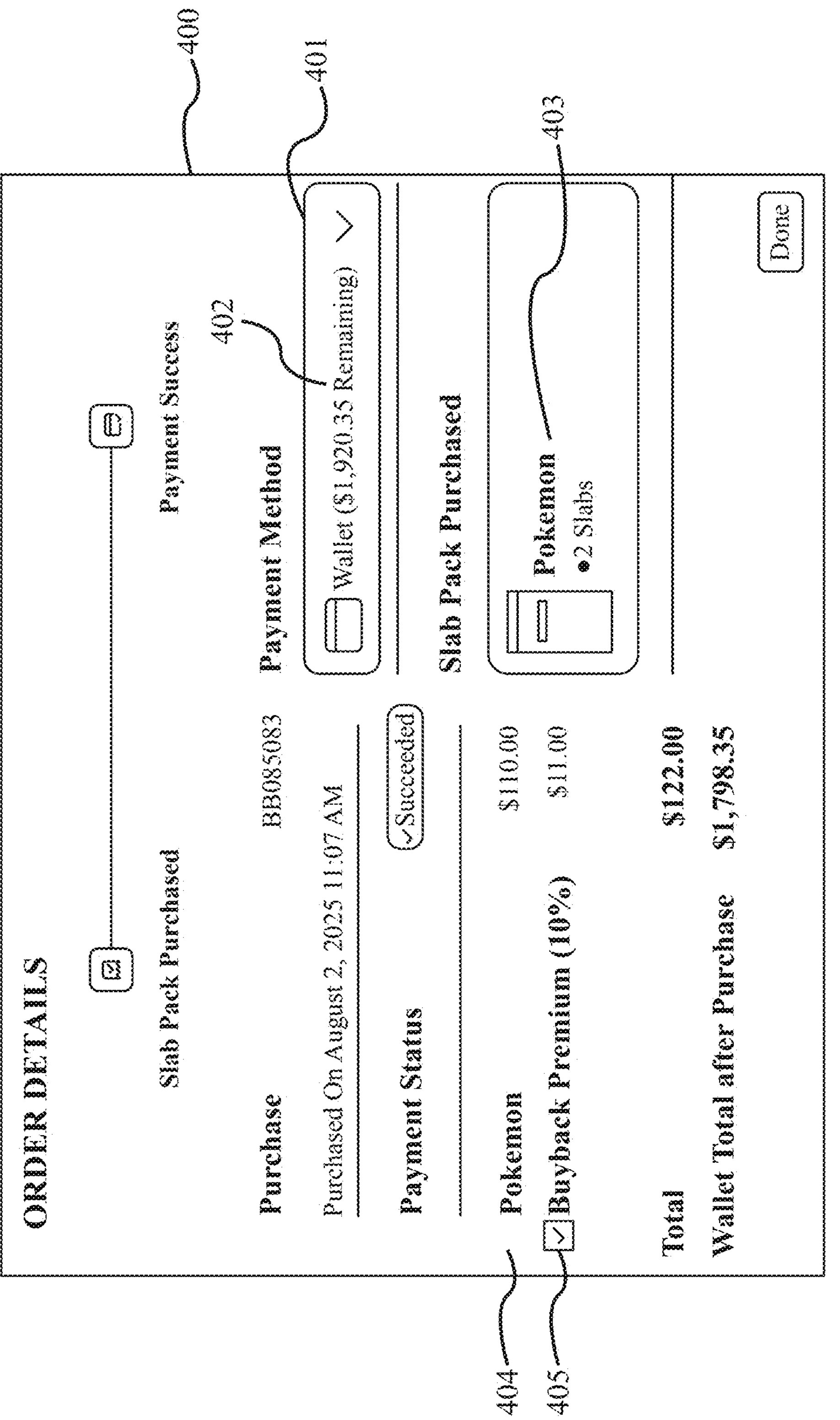
FIG. 4*a* depicts an exemplary embodiment of a user interface showing order details interface displaying the main order confirmation screen with purchase completion status, including the slab pack purchased section and purchase completion confirmation, the payment method selection display, and the payment status verification section.
Figure 4B:
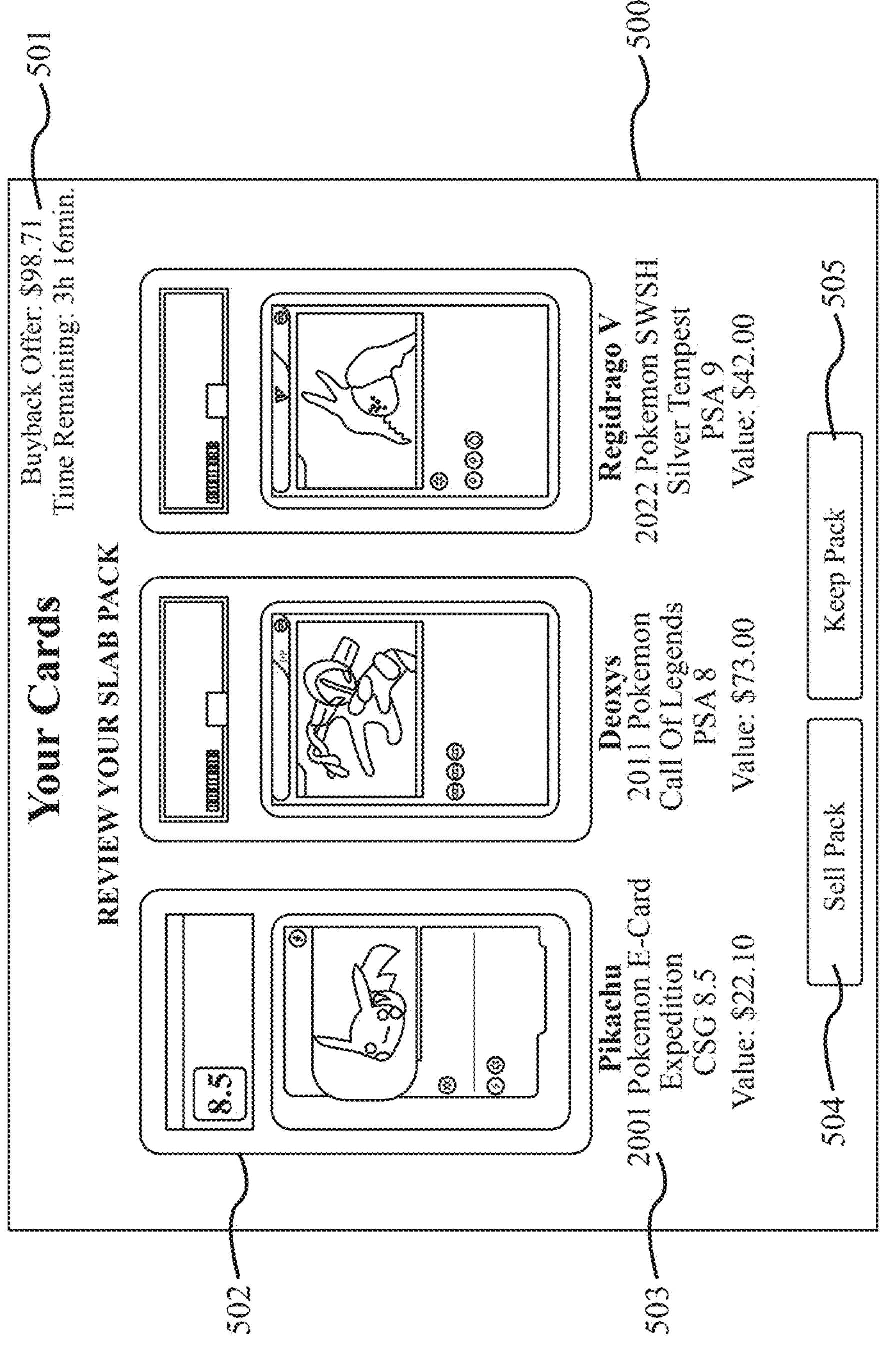
FIG. 4*b* depicts an exemplary embodiment of a user interface showing the pack reveal and buyback offer presentation interface with the main header section displaying the calculated offer amount and countdown timer for the time-limited decision period, and the pack review section.

FIG. 4*a* shows the order details interface (400) displaying purchase confirmation for a slab pack (403), including payment method selection (401) option from the user's wallet (402), payment status verification, and information showing the item purchased (404) with the optional buyback premium (405). The interface confirms the successful processing of the first financial transaction in the dual-transaction architecture. FIG. 4*b* illustrates the pack reveal and buyback offer presentation (500), showing individual collectible items (502) with their authentication grades and estimated values (503), the calculated buyback offer amount and time remaining (501), and the binary choice interface to either sell the item (504) or keep the item (505) that enforces pack-level transactional atomicity by requiring selection of the entire pack for repurchase.

Figure 5:
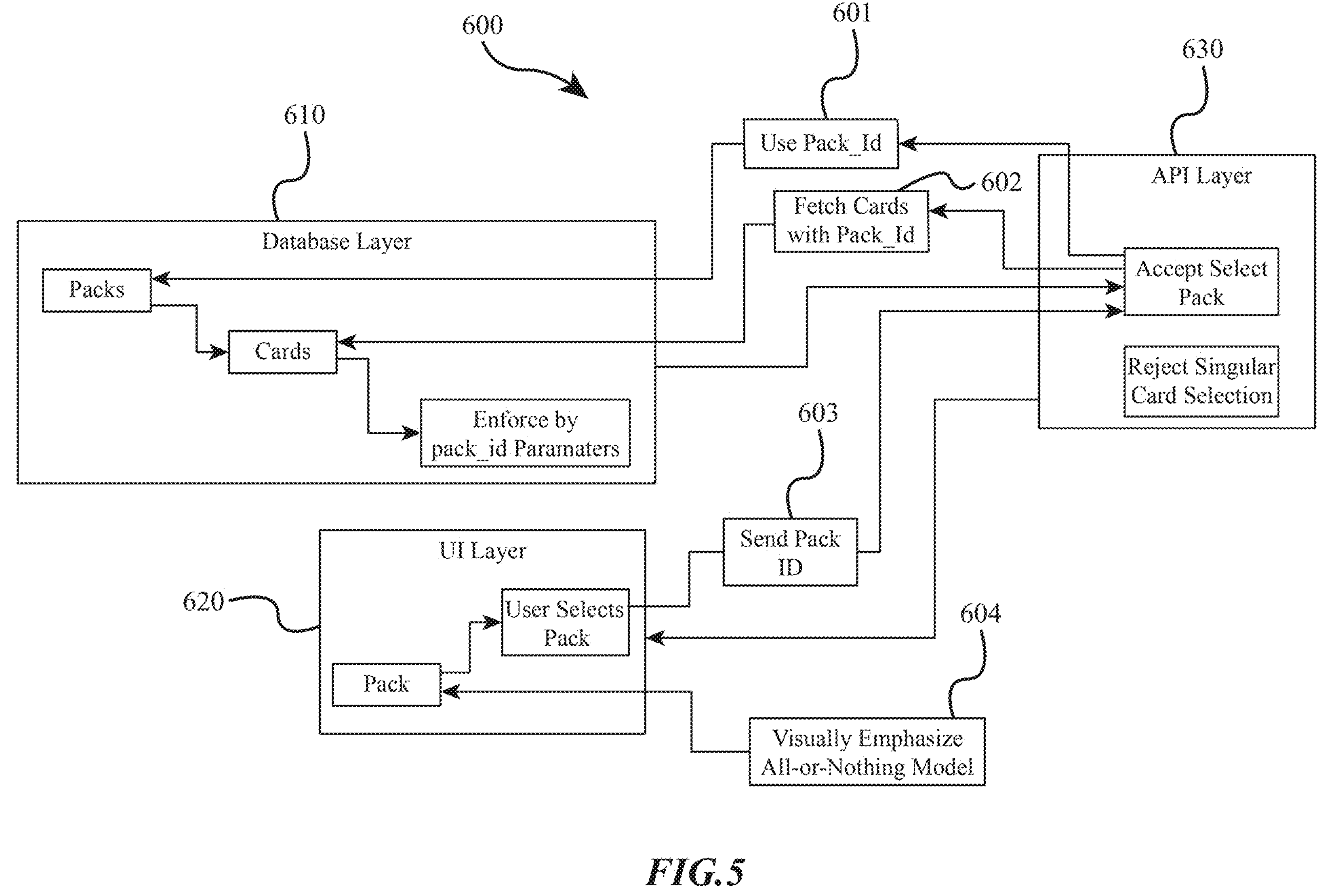
FIG. 5 depicts a pack-level atomicity enforcement architecture, showing the multi-layer technical implementation including database layer foreign key constraints, API layer endpoints accepting only pack_id parameters, and UI layer interface controls that collectively prevent individual card selection and enforce all-or-nothing pack transactions in accordance with an embodiment.

FIG. 5 demonstrates the pack-level atomicity enforcement architecture (600) across multiple system layers comprising three distinct architectural tiers that collectively ensure pack-level transaction integrity. The API layer (630) implements server-side enforcement mechanisms that process pack-level transaction requests while systematically rejecting individual card selections through validation protocols. The UI layer (620) coordinates user interface interactions by sending pack identification data to the API layer for processing, with the user selects pack component enabling pack-level selection functionality that presents users with complete pack options for transaction consideration. The database layer (610) maintains the foundational data integrity constraints that structurally enforce pack-level atomicity through foreign key relationships and referential integrity mechanisms linking individual cards to their parent pack instances. The reject singular card selection functionality operates as a critical validation component that prevents individual card transaction attempts from progressing through the system architecture, ensuring that all repurchase transactions maintain pack-level integrity. The visually emphasize all-or-nothing model component (604) provides user interface design elements that reinforce the pack-level transaction requirement through visual presentation and interaction design that communicates the atomic nature of pack transactions. The use pack_id and enforce by pack_id parameters functionality (601) implements the technical mechanism by which the system identifies and processes complete pack units, utilizing pack identification parameters to maintain referential integrity and ensure that all transaction operations apply to complete pack entities rather than individual card components, structurally preventing fractured ownership and ensuring the repurchase offer applies to the complete plurality of collectible items as an indivisible unit throughout the multi-layered enforcement architecture.

Figure 6A:
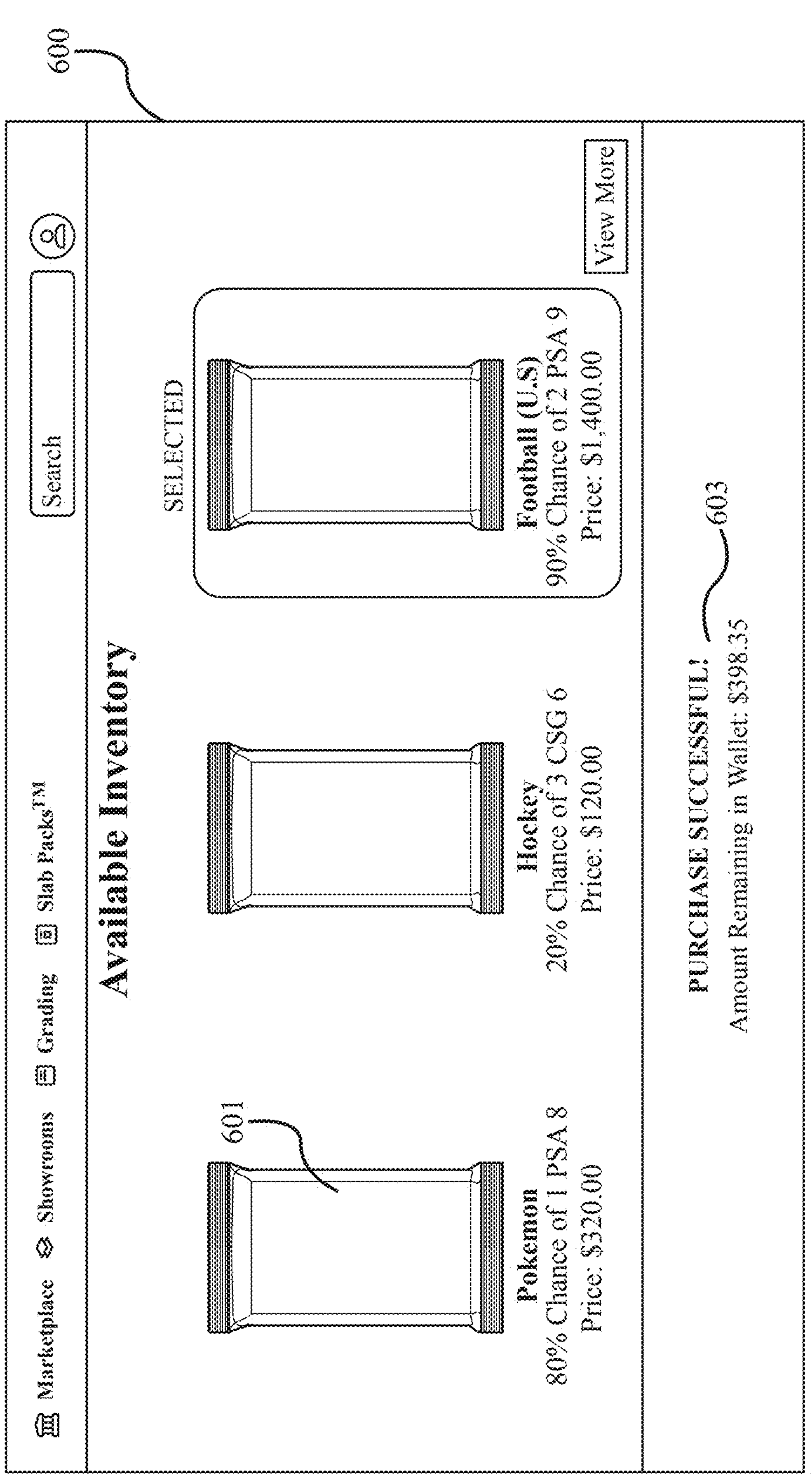
FIG. 6*a* depicts a user interface in an exemplary embodiment showing the marketplace interface for available inventory displaying the main marketplace and showrooms navigation header, with an available inventory section presenting collectible item series, demonstrating the pre-purchase state with available series and the interface's real-time inventory status maintenance through dynamic odds calculations via the continuous replenishment mechanism.
Figure 6B:
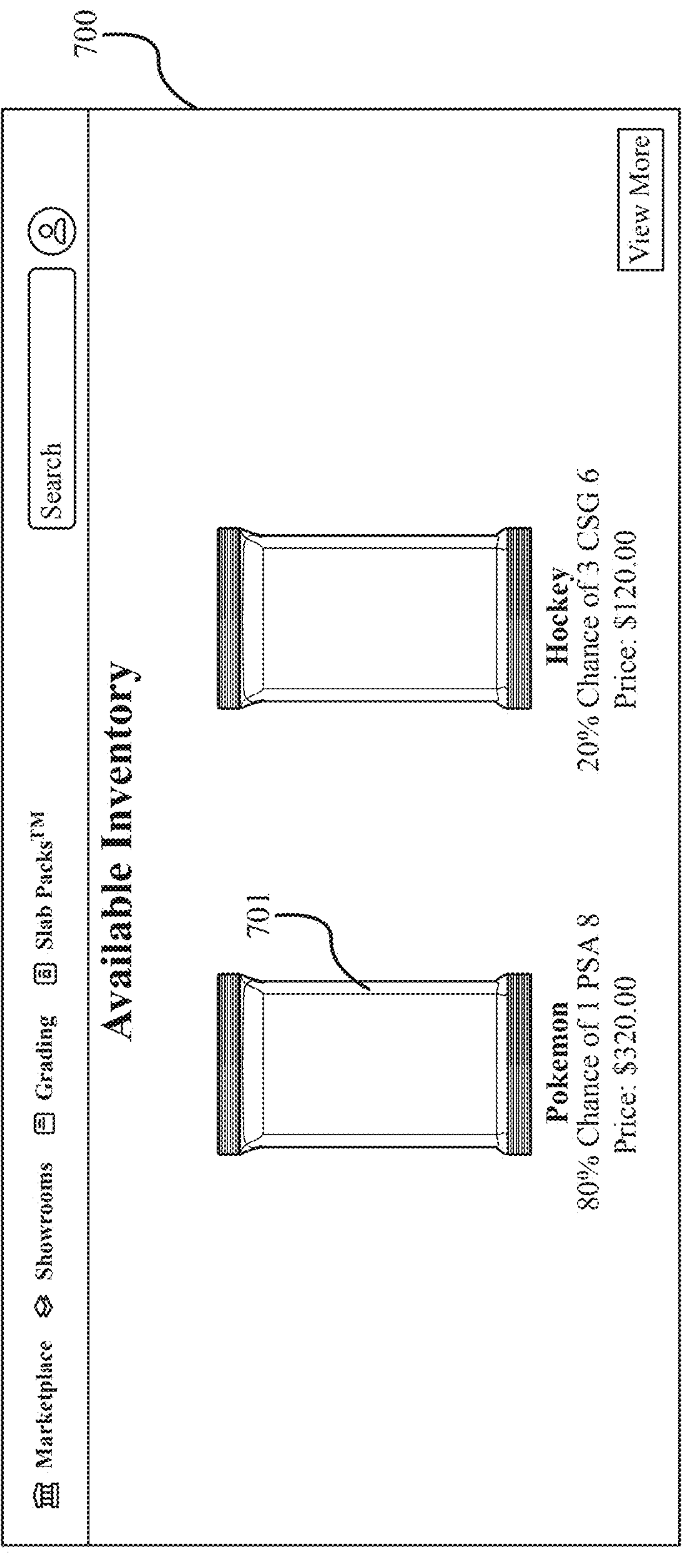
FIG. 6*b* depicts a user interface in an exemplary embodiment showing the post-purchase inventory updates with the updated marketplace interface and modified available inventory display, and illustrating the post-purchase inventory updates that trigger immediate odds recalculation.

FIGS. 6*a* and 6*b* illustrate the marketplace interface for available inventory (600) displaying the main marketplace and showrooms navigation header, with an available inventory section (601) presenting collectible item series including Pokemon series showing "80% Chance of 1 PSA 8" with "Price: $320.00", Hockey series displaying "20% Chance of 3 CSG 6" with "Price: $120.00", and Football (U.S.) series indicating "90% Chance of 2 PSA 9" with "Price: $1,400.00". The interface displays real-time inventory status and maintains dynamic odds calculations through the continuous replenishment mechanism. FIG. 6*a* shows the pre-purchase state with available series and includes a purchase confirmation message stating "PURCHASE SUCCESSFUL!" along with wallet balance information (603) showing "Amount Remaining in Wallet: $398.35". FIG. 6*b* demonstrates the post-purchase inventory updates with the updated marketplace interface (700) and modified available inventory display (701) showing the Pokemon and Hockey series remaining available while the Football (U.S.) series has been removed from the available inventory following the purchase transaction, demonstrating the post-purchase inventory updates that trigger immediate odds recalculation and real-time synchronization across connected client devices through the WebSocket-based communication infrastructure that maintains current availability status and dynamic probability calculations for all remaining collectible series.

Figure 7:
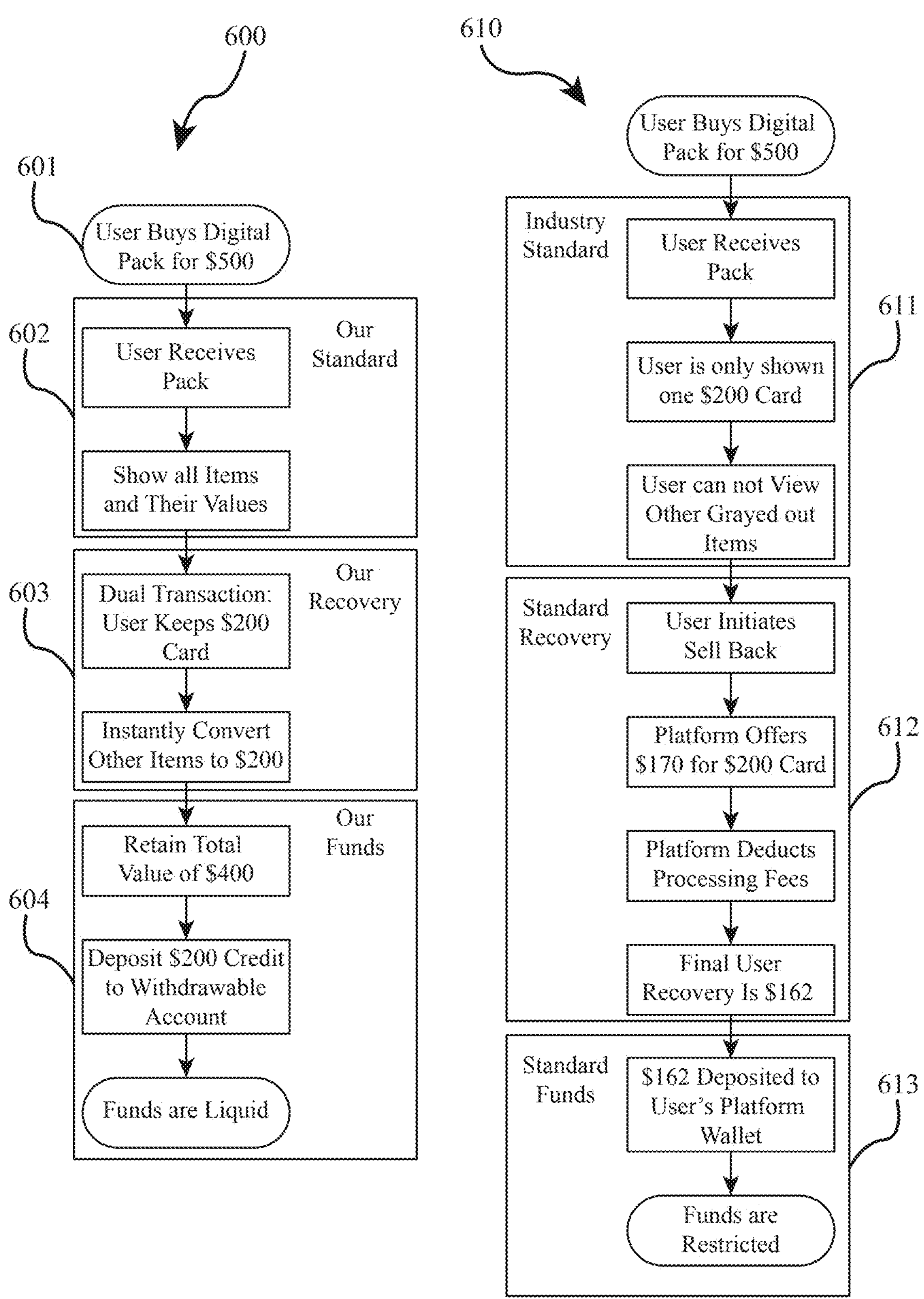
FIG. 7 depicts a competitive differentiation matrix, illustrating pack-value basis versus individual card basis, dual-transaction model benefits, withdrawable credits, and transparency features with specific recovery amount examples in accordance with an embodiment.

FIG. 7 provides a comparative analysis between the present system's pack-value approach (600-604) and conventional individual card-based industry approaches (610-613). The client system flow shows a user purchasing a digital pack (601) for $500, receiving transparent disclosure of all items and their values (602) where all items are shown with specific value information, utilizing the dual-transaction repurchase architecture (603) where the user retains $200 card value while instantly converting other items to $200 credit maintaining total value of $400, and receiving liquid, withdrawable credits (604) where $200 credit is deposited to a withdrawable account with funds that are liquid. The industry standard comparison (610-613) illustrates the limitations of individual card valuation approaches, demonstrating how users face greater financial risk and reduced transparency under conventional fair market value systems. In the industry standard flow, a user buys a digital pack for $500 (610), receives a pack where the user is only shown one $200 card while other grayed-out items cannot be viewed (611), initiates a sell back where the platform offers $170 for the $200 card and deducts processing fees resulting in a final user recovery of only $162 (612), and receives $162 deposited to the user's platform wallet where funds are restricted (613). This comparative analysis demonstrates the substantial consumer protection advantages of the pack-value methodology over individual card fair market value approaches.

Figure 8A:
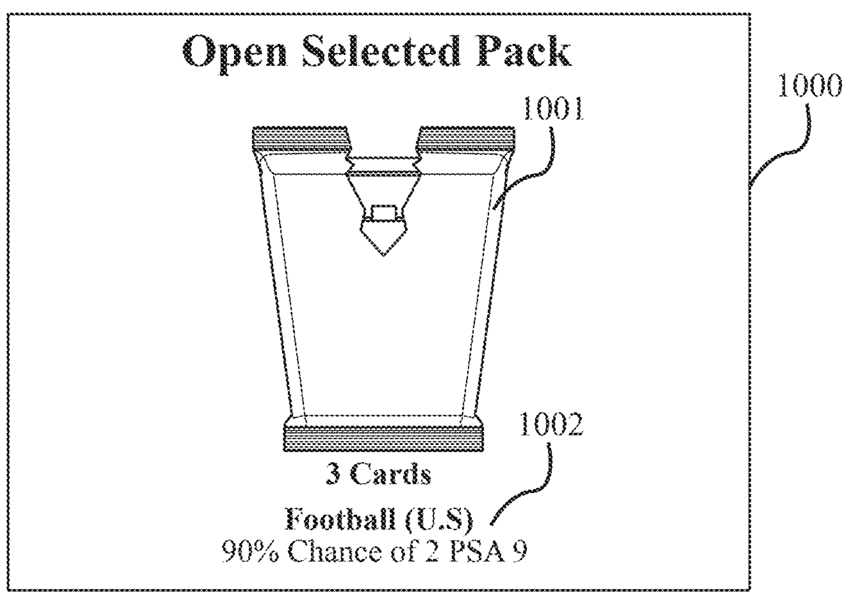
FIG. 8*a* depicts a user interface in an exemplary embodiment showing the traditional pack opening interface, a contents display section showing revealed collectible items, specific card display areas presenting individual collectible items with detailed information, card information displays showing values and authentication details for each revealed item, a "Sell Pack" action button for accepting the pack-level repurchase offer, and a "Keep Pack" action button for retaining the entire pack contents, demonstrating the standard pack reveal and decision interface that maintains pack-level atomicity through the binary choice structure.
Figure 8A:
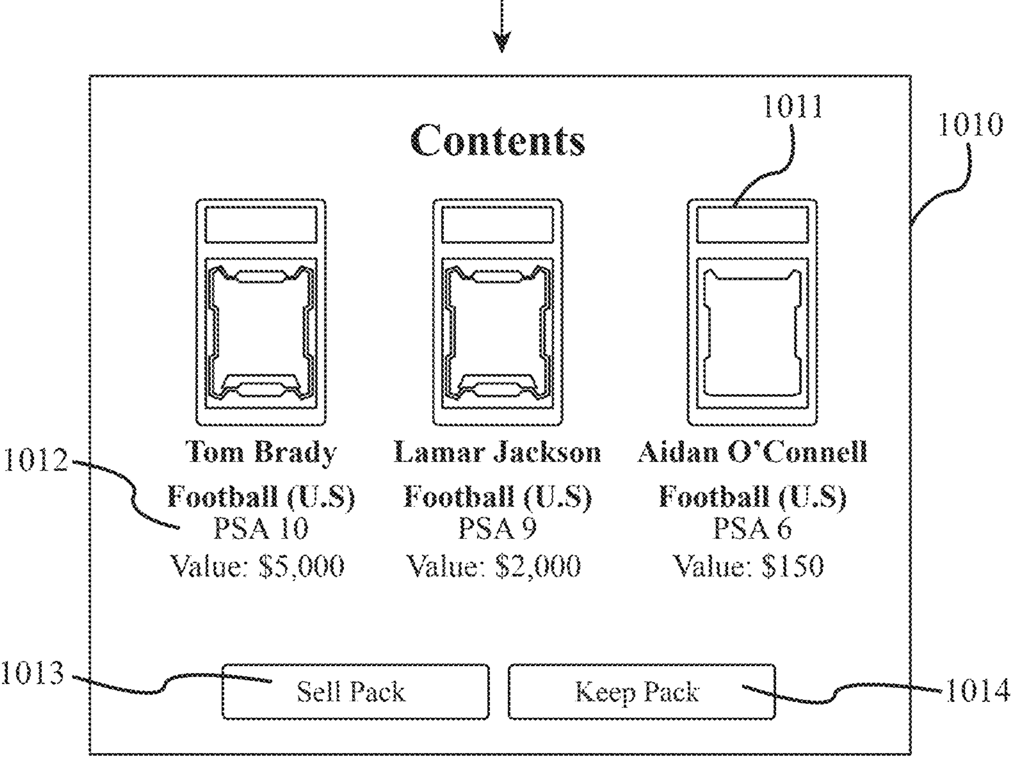
Figure 8B:
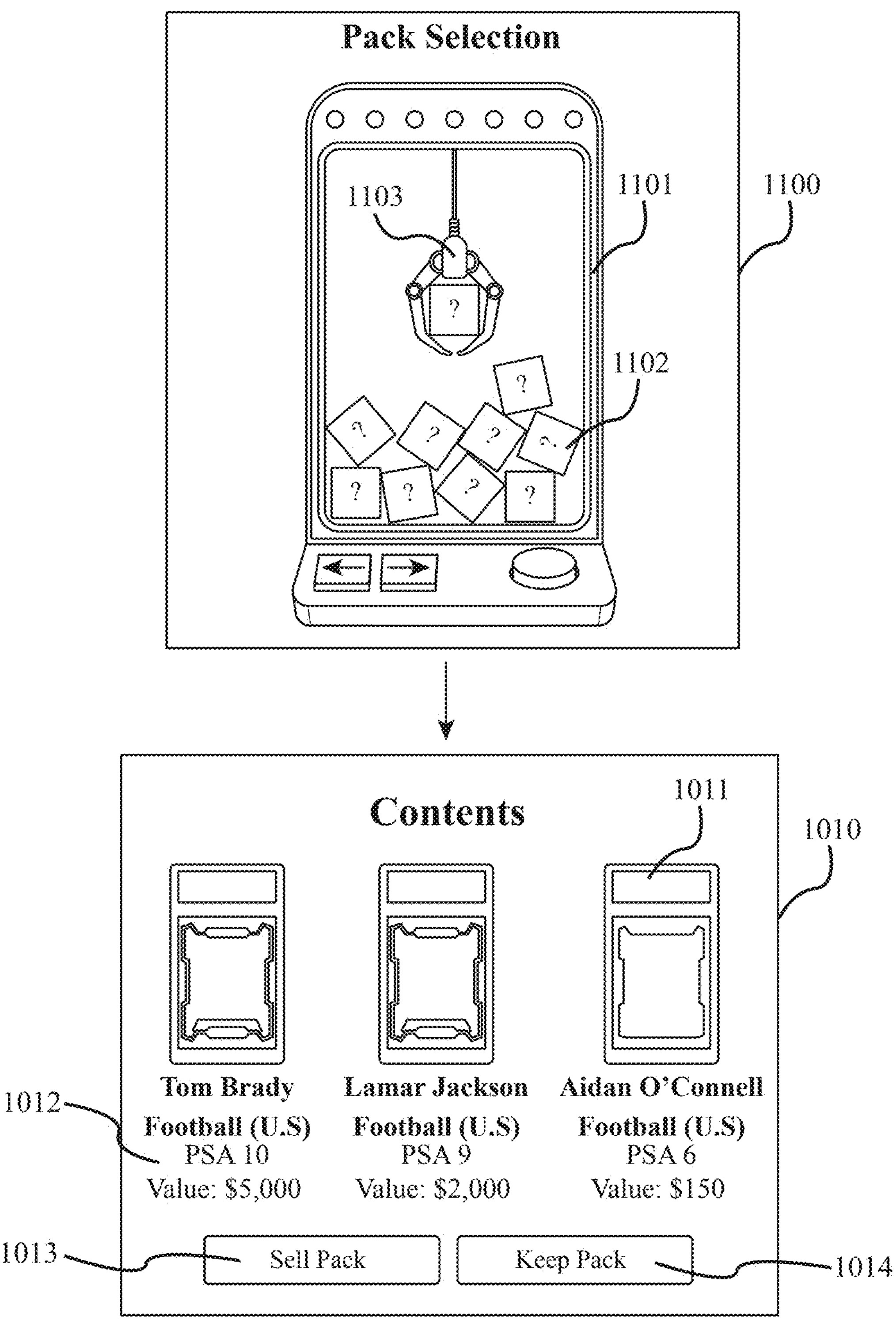
FIG. 8*b* depicts a user interface in an exemplary embodiment showing the virtual claw machine simulation interface with the main claw machine display providing the primary game environment, mechanical claw apparatus for user interaction and control, the prize/pack selection area containing available packs for acquisition, and the pack selection indicator showing current targeting and selection status, creating a game-of-skill presentation layer that maintains the underlying pack-based transaction model while offering an alternative user interaction paradigm that preserves pack-level atomicity and the dual-transaction architecture.
Figure 8C:
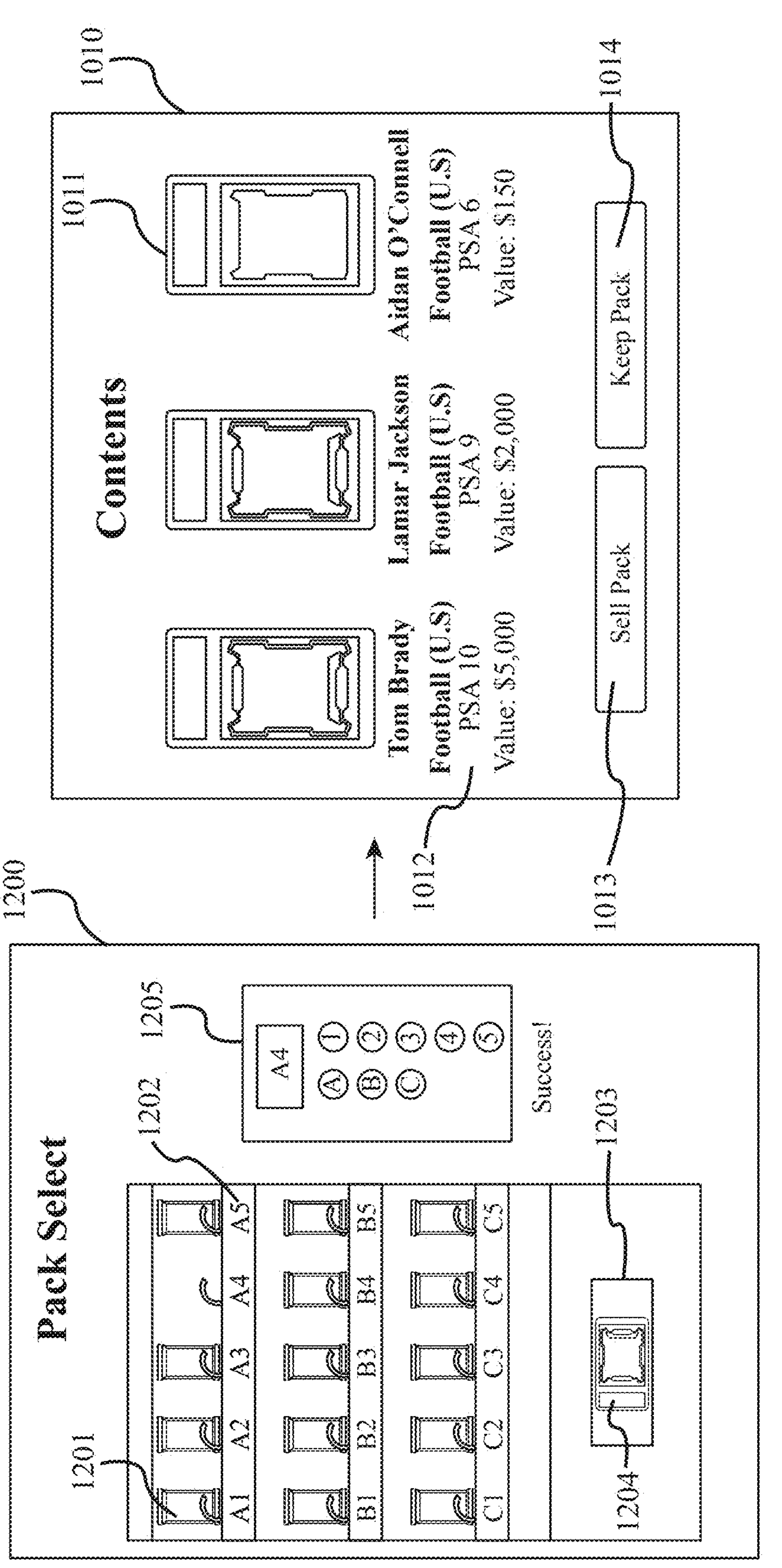
FIG. 8*c* depicts a user interface in an exemplary embodiment showing the vending machine simulation interface with the pack selection screen displaying the main vending interface, individual pack options arranged in traditional vending machine slots, reference number displays for product identification and selection, success confirmation messages upon selection completion, product dispensing animations simulating realistic vending machine operation, and the selection panel grid displaying the traditional vending machine button layout, providing an alternative interface while maintaining the core pack-value repurchase system and transaction integrity.
Figure 8D:
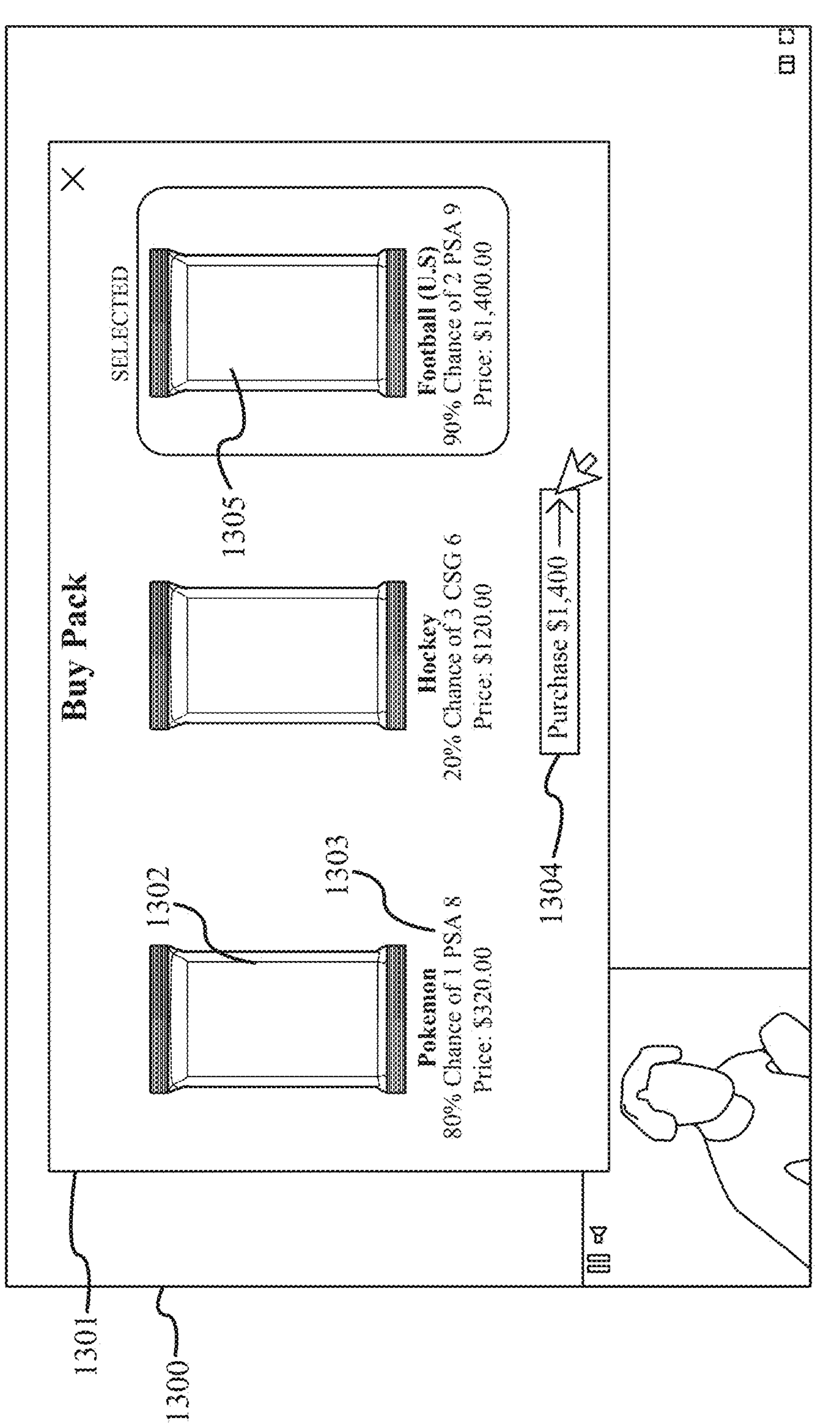
FIG. 8*d* depicts a user interface in an exemplary embodiment showing the live-streaming integration interface with the main streaming interface providing the broadcast environment, purchase dialog overlays for real-time transaction processing during live sessions, pack selection displays showing available inventory with real-time availability status, pack information panels displaying current pack details including odds and pricing information, purchase confirmation buttons enabling immediate transaction completion within the streaming environment, and selected pack indicators highlighting user choices and selections, enabling synchronized reveal experiences across multiple client devices while maintaining real-time transparency and pack-level transaction integrity.
Figure 8E:
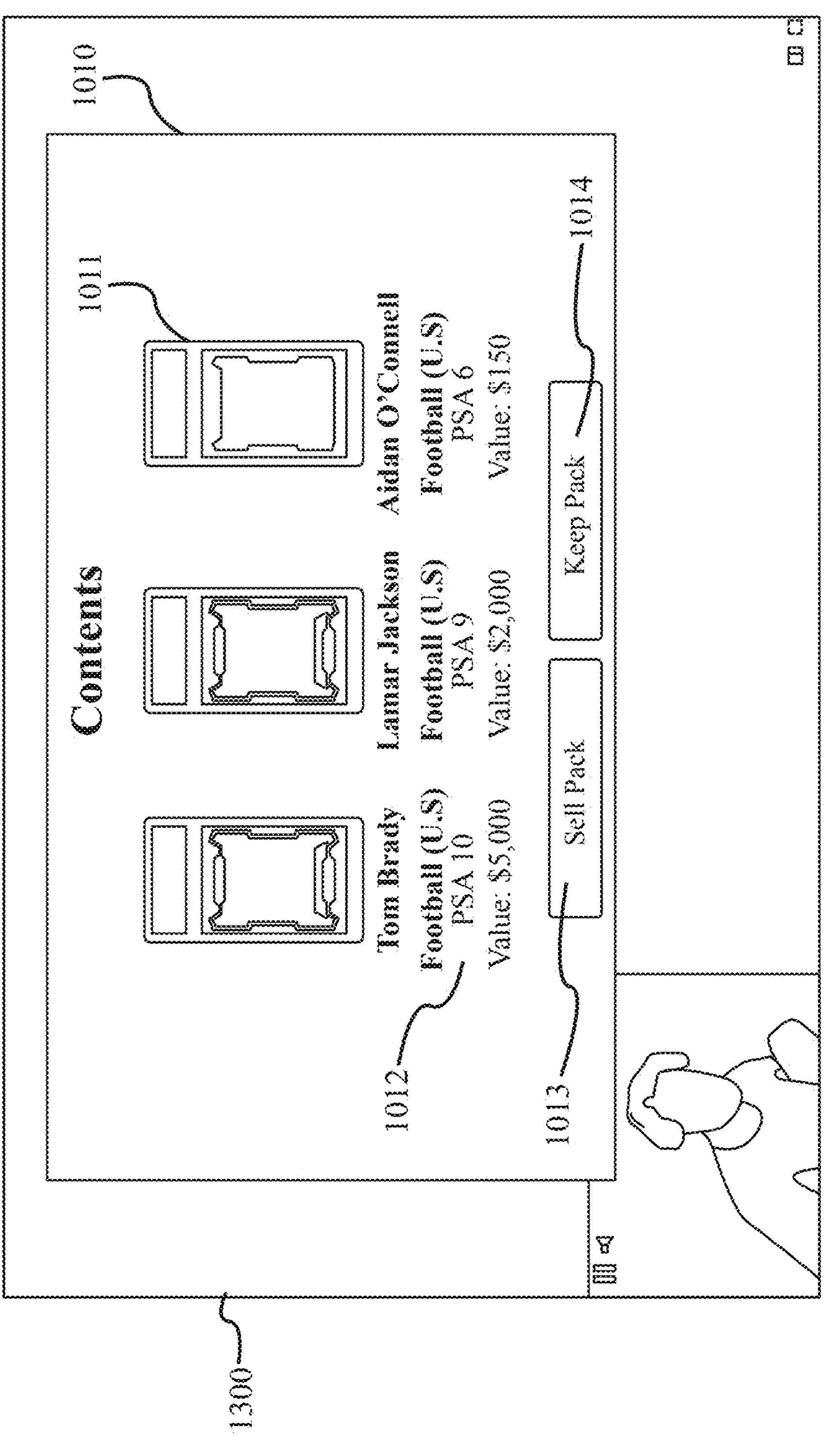
FIG. 8*e* depicts a user interface in an exemplary embodiment showing the live-streaming content reveal interface showing the contents display section within the streaming environment, individual card displays presenting revealed collectible items to the streaming audience, card information displays showing detailed authentication and value data for each item, the "Sell Pack" action button for accepting the pack-level repurchase offer during the live session, and the "Keep Pack" action button for retaining the entire pack contents, illustrating how the synchronized reveal experience maintains the atomic pack-level decision framework and dual-transaction architecture within the live-streaming context while providing real-time engagement for both the host and viewing audience.

FIGS. 8*a* through 8*e* demonstrate various user interface implementations that maintain the underlying pack-value repurchase system while providing diverse presentation paradigms. FIG. 8*a* shows the pack opening interface (1000) displaying the "Open Selected Pack" heading, with individual pack selection options (1001, 1002) representing different available pack configurations, a contents display section (1010) showing revealed collectible items, specific card display areas (1011) presenting individual collectible items with detailed information, card information displays (1012) showing values and authentication details for each revealed item, a "Sell Pack" action button (1013) for accepting the pack-level repurchase offer, and a "Keep Pack" action button (1014) for retaining the entire pack contents. FIG. 8*b* illustrates the claw machine simulation interface with the main claw machine display (1100), the mechanical claw apparatus (1101) for user interaction, the prize/pack selection area (1102) containing available packs, and the pack selection indicator (1103) showing current targeting. FIG. 8*c* depicts the vending machine interface with the pack selection screen (1200), individual pack options (1201) arranged in vending slots, reference number displays (1202) for product identification, success confirmation messages (1203) upon selection completion, product dispensing animations (1204) simulating physical vending machine operation, and the selection panel grid (1205) displaying the traditional vending machine button layout (A1-A5, B1-B5, C1-C5). FIGS. 8*d* and 8*e* show live-streaming integration capabilities with the main streaming interface (1300), purchase dialog overlays (1301) for real-time transaction processing, pack selection displays (1302) showing available inventory during live sessions, pack information panels (1303) displaying current pack details and odds, purchase confirmation buttons (1304) enabling immediate transaction completion, and selected pack indicators (1305) highlighting user choices, all of which enable synchronized reveal experiences across multiple client devices while maintaining the real-time transparency and pack-level transaction integrity of the underlying system architecture.

The system architecture in accordance with an embodiment centers around a database engine server (610) that forms the central data repository of the platform. This database engine server implements a distributed database architecture that maintains consistent data across multiple nodes to ensure high availability and fault tolerance, a critical requirement for the real-time buyback processing that distinguishes the present invention from conventional collectibles platforms.

Connected to this central repository in accordance with an embodiment are a plurality of listing servers (620) and picture servers (630) that maintain digital representations of physical collectibles. These servers work in coordination with a real-time inventory management system (640) that interfaces through the distributed database architecture to maintain synchronized digital representations of collectible items and their associated metadata.

The architecture in accordance with an embodiment further includes a computer vision system (650) that connects to the picture servers to enable scanning and authentication of physical items, ensuring the integrity of the digital representations stored within the system. A transaction processing system (660) integrates directly with the database engine to handle purchase requests, account management, and the critical dual-transaction processing that enables the pack-value based repurchase functionality of the present invention.

The system implements a network-based notification system (670) that establishes persistent connections with user devices to transmit real-time updates throughout the platform. This notification system utilizes persistent bidirectional communication channels, preferably implemented through WebSocket connections, to enable the real-time synchronization of inventory data, odds calculations, and transaction status updates that are essential to the transparent and dynamic user experience provided by the invention.

The network topology supports a connection manager enabling real-time bidirectional communication, wherein the communication comprises messages selected from the group consisting of indications that a collectible item has been sold, a new collectible item has been added to the queue, and that the odds pertaining to a collectible item have changed. This real-time communication infrastructure is fundamental to the live-updating checklist and dynamic odds calculation features that distinguish the present system from less transparent competitor offerings.

Processing nodes distributed throughout the system execute odds calculations and inventory updates triggered by collectible item acquisitions. These processing nodes comprise an odds calculation engine continuously monitoring inventory changes, an inventory manager coordinating database updates, local caches maintaining frequently accessed data, and periodic synchronization mechanisms with the primary database cluster.

The transaction processing system in accordance with an embodiment integrates with external payment gateways, with STRIPE serving as the preferred payment processor for the initial purchase transactions in the dual-transaction architecture. The system in accordance with an embodiment utilizes STRIPE Checkout to handle payments for pack purchases, with webhook handling for various payment events including checkout.session.expired, checkout.session.completed, checkout.session.payment_succeeded, and checkout.session.payment_failed, where the nomenclature of each of the aforementioned payment events suggests their purpose as would be readily understood by those skilled in the art.

This integration with external payment gateways in accordance with an embodiment forms the first component of the inventive dual-transaction financial architecture. The initial purchase transaction is processed through the external gateway as a standard e-commerce transaction, while the subsequent repurchase transaction—if the user accepts the pack-value based buyback offer—is executed through an entirely separate internal ledger system, providing the regulatory, accounting, and user experience advantages that distinguish the present invention from conventional net-settlement approaches.

The payment gateway integration in accordance with an embodiment includes transaction metadata embedding to maintain logical connections between the two distinct financial events while preserving their architectural separation. This design enables the system to provide immediate liquidity through the internal ledger credit system while maintaining clear transactional boundaries that support both regulatory compliance and simplified accounting procedures.

The underlying database architecture in accordance with an exemplary embodiment implements a schema design optimized for the real-time inventory management and transaction processing requirements of the invention. The SlabPackSeries table (710) contains fields for status (711), creation date (712), category associations (713), cards per pack counts (714), remaining packs (715), and state flags (716) that control series visibility and editability.

Supporting this core table in accordance with an exemplary embodiment, the SlabPackCategory table (720) defines product groupings through name (721), description (722), and tier assignment (723) fields, while the SlabPackTier table (730) manages pricing information (731) and inventory thresholds (732). Foreign key relationships between these tables enable tracking of inventory and series management, with database-level constraints enforcing the pack-level transactional atomicity that prevents fractured ownership and maintains the integrity of the pack-based repurchase model.

This foundational system architecture in accordance with an embodiment provides the robust technical infrastructure necessary to implement the novel pack-value based repurchase system and dual-transaction financial architecture that form the core inventive concepts of the present patent application, while supporting the real-time transparency and user experience features that distinguish the invention from existing competitor platforms in the digital collectibles marketplace.

As the core inventive element of the system, the pack-value repurchase engine in accordance with an embodiment implements a financial calculation and transaction processing architecture that fundamentally distinguishes the present invention from conventional fair market value-based competitor systems. The engine operates through multiple integrated subsystems that collectively provide the guaranteed value floor protection that transforms speculative collectible purchases into insured transactions.

In accordance with an embodiment, the system implements a purchase price recording architecture through dedicated database schemas specifically designed to capture and preserve the original transaction parameters essential for the pack-value calculation methodology. The SlabPackSeries table (710) maintains critical fields including the pack pricing information integrated with the SlabPackTier table (730) that manages pricing information (731) and inventory thresholds (732), establishing the foundational data structure for accurate pack price retention.

Upon initiation of a pack purchase transaction in accordance with an embodiment, the system creates a unique transaction record that captures not only the base pack price but also any optional premium selected by the user during the checkout process. The system in accordance with an embodiment utilizes an algorithm that dynamically calculates and updates the total purchase price in real-time as the premium program is selected or deselected. When a customer selects the premium program, the system adds a fixed percentage, in accordance with a preferred embodiment 10% of the pack price offered for sale, ensuring that the price adjustment for the initial transaction is immediate and accurately reflects the additional premium associated with the premium program's enhanced protection service.

The database architecture in accordance with an embodiment maintains transactional integrity through atomic database operations that ensure the original pack purchase price, including any premium, is permanently recorded and associated with the specific pack instance identifier. This recorded purchase price becomes the immutable basis for the subsequent pack-value calculation, providing users with the predictable financial protection that distinguishes the present system from volatile fair market value approaches employed by other attempted solutions.

The dynamic offer calculation engine in accordance with an exemplary embodiment represents the technical heart of the inventive system, utilizing the specific formula: offerPrice=max(0.8×packPrice, 0.9×aggregateEV), where aggregateEV represents the estimated value of all cards in the pack collectively. This formula ensures that users receive a fair offer that balances pack purchase price against actual card values while providing the guaranteed minimum return that fundamentally differentiates the system from competitor approaches.

In accordance with an embodiment, the system interfaces with the inventory management system through TypeScript and SQL transactions using TypeORM to maintain current pricing data for the aggregateEV calculations. The engine employs a valuation methodology that incorporates market price data from verified sales platforms, professional grading assessments, historical transaction records, and real-time demand metrics using a confidence-weighted reconciliation algorithm. When conflicting valuations occur, the system in accordance with an embodiment calculates variance across different method outputs and dynamically adjusts weights based on data availability and consistency metrics for each specific collectible category.

The technical implementation in accordance with an embodiment demonstrates the superior protection provided by the pack-value approach through specific operational scenarios. When the aggregateEV significantly exceeds the original pack price—for example, when a user pays $110 for a pack but pulls cards with a combined $1,000 estimated value—the system applies the 90% EV component of the formula, resulting in a $900 buyback offer. This scenario demonstrates how the system handles high-value discoveries while providing substantial returns to users who opt into the premium protection during initial checkout.

Conversely, in accordance with a preferred embodiment, when pack value falls below the purchase price—for example, when a user pays $110 but pulls cards with only $50 combined estimated value—the system applies the 80% pack price component of the formula, resulting in an $80 offer. This implementation protects users from significant losses while maintaining program sustainability, providing a concrete financial safety net unavailable in competitor systems that base offers solely on individual card fair market value.

In accordance with an embodiment, the system implements a time-limited offer architecture that creates urgency while providing users sufficient time to make informed decisions regarding their pack contents. The offer is presented as a time-limited opportunity with a prominent configurable irrevocable timer, emphasizing the pack-level nature of the transaction and the discrete financial event it represents.

The technical implementation in accordance with an embodiment utilizes React components that render the repurchase offer modal with the configurable countdown timer, clearly communicating the time-limited nature of the offer through visual elements that change color as the deadline approaches. This modal appears post-reveal, displaying the calculated offer price based on the pack-value formula while providing users with transparent pricing information and emphasizing the irrevocable time constraint.

The system in accordance with an embodiment maintains persistent WebSocket connections using a publish-subscribe architecture to provide real-time status updates throughout the offer presentation and acceptance window. The WebSocket server pushes immediate notifications when the offer is initiated, when the configurable countdown begins, and provides continuous updates of the remaining acceptance time. During the acceptance window, the offer amount can be automatically recalculated whenever fresh market data updates a card's estimated value, allowing offers to be raised or lowered in real time to reflect the most current market conditions while maintaining the relevance and fairness of the buyback system throughout the entire acceptance period.

The expiration handling mechanism in accordance with an embodiment implements database-level triggers and automated cleanup procedures that ensure expired offers are properly invalidated and cannot be inadvertently accepted. The system maintains audit logs of offer generation, modification, and expiration events to provide full transactional transparency and regulatory compliance support.

The user interface implementation in accordance with an embodiment provides a streamlined and intuitive experience for users to evaluate and respond to pack-value repurchase offers. The interface prominently displays the relationship between the optional premium paid during initial checkout and the subsequent offer, enabling users to understand the direct benefit of the enhanced protection they purchased.

In accordance with an embodiment, the offer modal interface implements responsive design principles that maintain usability across mobile and desktop devices, incorporating visual elements that clearly present the offer amount, the calculation basis, and the time remaining for acceptance. The system displays the offer as a single value for the entire pack, with no option to select or exclude individual cards from the transaction, deliberately contrasting with competitors' systems that may allow users to choose individual cards for sale or retention.

The interface in accordance with an embodiment provides clear indication that all cards revealed from the pack must be sold together as a single unit if the offer is accepted, maintaining the pack-level transactional atomicity that simplifies inventory management and provides clear operational advantages over fractured ownership models. The user is presented with a binary choice: keep the entire pack or sell the entire pack back through the offer presented by the system, with the user interface specifically designed to prevent individual card selection.

Upon acceptance of the offer in accordance with an embodiment, the interface provides immediate confirmation and transitions to display the credit posting to the user's in-platform wallet. The system implements real-time notifications through WebSocket connections to provide immediate feedback when the wallet credit is completed, ensuring users maintain complete visibility into the transaction processing.

The pack-value repurchase architecture in accordance with an embodiment provides demonstrable advantages over competitor fair market value-based systems through concrete risk mitigation and user protection mechanisms.

In accordance with an embodiment, a user purchasing a $500 pack through the present system with premium protection who receives cards with a combined estimated value of $200 would receive a buyback offer of $400 (80% of the $500 pack price), compared to approximately $162 under competitor systems (90% of $200 FMV minus 6% fees). This represents a recovery difference of $238, demonstrating the substantial financial protection advantage of the pack-value approach.

The technical superiority in accordance with an embodiment extends beyond individual transaction benefits to encompass systemic advantages in accounting, regulatory compliance, and operational efficiency. The pack-level atomicity enforcement prevents the inventory tracking complications and inconsistent user experiences associated with fractured ownership models, while the dual-transaction architecture provides clear separation between the initial purchase and subsequent repurchase events.

The transparency advantages in accordance with an embodiment include the provision of complete checklists with per-item acquisition odds compared to competitor approaches that may display only "top hits" or provide odds by value ranges rather than specific card probabilities. This transparency, combined with the guaranteed value floor protection, creates a superior user experience that addresses the fundamental problems of financial risk and opacity that plague conventional digital collectibles platforms.

The liquidity advantages in accordance with an embodiment are exemplified through the immediate posting of withdrawable credits to user wallets upon offer acceptance, contrasting with platforms that provide non-withdrawable platform credits or systems that operate with non-cashable internal currencies. This immediate liquidity provision, combined with the guaranteed minimum return protection, establishes the present system as a superior alternative to existing market approaches while maintaining the economic viability necessary for sustainable platform operation.

The dual-transaction financial architecture in accordance with an embodiment represents a fundamental technical innovation that provides clear operational, regulatory, and user experience advantages over conventional net-settlement approaches employed by competitor platforms. This architecture implements a deliberate separation between the initial purchase transaction and the subsequent repurchase transaction, creating two distinct financial events that maintain logical relationships while preserving their technical independence for accounting and compliance purposes.

The first transaction in accordance with an embodiment constitutes the standard e-commerce purchase flow that processes the user's payment for a digital pack of collectible items, including any optional premium selected during checkout. In a preferred embodiment, the system utilizes STRIPE Checkout to handle payments for pack purchases, with integration that includes handling various webhook events such as checkout.session.expired, checkout.session.completed, checkout.session.payment_succeeded, and checkout.session.payment_failed.

The initial transaction processing in accordance with an embodiment implements a server-side integration pattern to prevent exposure of API keys on the client side. During the initial purchase, the system creates standard STRIPE Checkout sessions that include the pack price plus the optional premium when selected by the user. The system utilizes an algorithm that dynamically calculates and updates the total purchase price in real-time as the premium program is selected or deselected, with the premium typically set at a fixed percentage of the pack price offered for sale.

The technical implementation in accordance with an embodiment follows established payment card industry standards while maintaining explicit separation of concerns in the codebase. The system generates a unique checkout session that integrates with STRIPE Checkout for secure payment processing, with this session specifically associated with the selected slab pack purchase. Transaction metadata is systematically embedded during this initial transaction to enable future logical connections while preserving the discrete nature of each financial event.

Upon successful completion in accordance with an embodiment, the first transaction results in a complete and final sale that is recorded in the system's database with full transactional details including the purchase price, any premium amount, user identification, and pack specifications. This transaction stands alone as a discrete financial event, with no dependencies on any subsequent user actions or system offers.

The second transaction in accordance with an embodiment represents a completely separate financial event that occurs only if the user accepts the time-limited repurchase offer following card reveal. This transaction is processed entirely through a ledger-based approach where the platform's master ledger is debited and the user's in-platform wallet is credited, with no payment processor transaction occurring at the time of offer acceptance.

The ledger-based implementation in accordance with an embodiment utilizes a relational database such as PostgreSQL with funds held in a client-managed account, enabling instant settlement of buyback transactions while maintaining proper financial separation from the initial purchase. This architecture creates a complete separation between the two financial events while maintaining their logical relationship through embedded transaction metadata that preserves connections without compromising the independence required for proper accounting and regulatory compliance.

The technical execution in accordance with an embodiment implements a specialized state machine that tracks transaction status through discrete states including offer_initiated, ledger_processing, funds_credited, and transaction_completed, each of which as those skilled in the art would recognize support the description of each state in the context of the system. Each state transition triggers microservice operations automatically, with transaction metadata embedded in every API call to maintain logical connections between the separate financial events while preserving their architectural independence.

The ledger-first design in accordance with an embodiment enables immediate offer fulfillment while differentiating this system from conventional refund-based approaches, providing users with instant settlement rather than delayed payment processing. The system implements a purely ledger-based approach where no external payment processor transaction occurs at the time of offer acceptance, maintaining full compliance with payment card industry standards while keeping the platform outside money-transmitter regulatory scope.

The database architecture in accordance with an embodiment implements specialized schemas specifically designed to support the dual-transaction model while maintaining clear separation and audit capabilities. The system implements a relational database schema with dedicated tables for each transaction type, ensuring proper segregation of the discrete financial events.

The transaction recording schema in accordance with an embodiment includes fields for the initial purchase transaction: transaction_id, user_id, pack_id, purchase_amount, premium_amount, payment_gateway_reference, STRIPE_session_id, transaction_timestamp, and status indicators, as would be readily understood by those skilled in the art. Each record maintains complete independence while including metadata fields that enable logical relationship tracking without compromising transactional separation.

For the repurchase transaction in accordance with an embodiment, the schema implements dedicated fields including: ledger_transaction_id, originating_purchase_id, offer_amount, acceptance_timestamp, ledger_debit_reference, wallet_credit_reference, and state tracking fields, as would be readily understood by those skilled in the art. Foreign key relationships link the transactions through metadata while preserving their fundamental independence for accounting and compliance purposes.

The reconciliation architecture in accordance with an embodiment employs optimistic locking with version control fields to prevent race conditions during concurrent transaction processing, while database-level ACID transactions ensure atomicity across related tables. The system implements error handling with automatic retry logic for failed operations, with configurable exponential backoff intervals for payment gateway integrations.

Transaction state management in accordance with an embodiment implements dedicated event handlers that update associated records and generate user notifications through a multi-channel delivery system. Each state transition preserves immutable audit trails through append-only database records that maintain the relationship between initial purchase and subsequent offer transactions while preserving their technical independence.

The system in accordance with an embodiment implements a set of RESTful API endpoints that support the dual-transaction architecture, with each endpoint optimized for discrete financial events and security requirements. For the initial purchase transaction, the system exposes endpoints that accept POST requests containing packId, userId, and slabSafeEnabled parameters, returning STRIPE checkout session identifiers and pre-calculated pricing details including optional premium amounts.

These purchase endpoints in accordance with an embodiment implement JWT authentication and idempotency keys to prevent duplicate transactions, with payload validation middleware that verifies transaction request integrity before allowing progression to business logic layers. The endpoints follow RESTful design principles with clear resource modeling that treats packs as transactional units for purchase operations.

The repurchase offer endpoints in accordance with an embodiment manage the time-sensitive offer period through specialized sub-routes that calculate offers using the dynamic formula and trigger the second discrete transaction upon acceptance. These endpoints implement elevated authentication requirements for credit operations, with tiered permission systems providing granular control over transaction-specific functions.

Security protocols in accordance with an embodiment implement transaction idempotency protection using unique cryptographic identifiers for each discrete financial event. When an offer is accepted, the system generates tamper-resistant digital signatures combining pack identifiers, offer amounts, and timestamps, which must be cryptographically verified before the second transaction proceeds. This verification process employs public-key infrastructure to validate user acceptance intent while preventing replay attacks or fraudulent acceptances.

Access control mechanisms in accordance with an embodiment implement role-based permission structures with granular control over transaction-specific functions, requiring multi-factor authentication for critical operations such as offer acceptance and wallet withdrawals. The system enforces strict data validation between transaction steps using schema enforcement, type checking, and cross-reference verification that ensures consistency between displayed offers and actual transaction amounts processed.

The dual-transaction architecture in accordance with an embodiment provides significant regulatory compliance advantages by maintaining clear separation between distinct financial events rather than implementing net-settlement approaches that can create regulatory ambiguities. The ledger-first design enables instant buyback settlement while keeping the platform outside money-transmitter regulatory scope, with external payment processors being utilized only when users later withdraw funds to their bank accounts or debit cards.

This architectural approach in accordance with an embodiment clearly delineates the initial purchase from the subsequent offer, representing a significant technical and business model improvement over systems that use net settlement. By implementing two discrete transactions rather than a single net settlement approach, the system maintains proper accounting separation while providing users with clear financial records of each distinct event.

The compliance benefits in accordance with an embodiment extend to simplified reporting and audit requirements, as each transaction maintains independent records with clear timestamps, amounts, and participant identification. The system's approach avoids the complex regulatory considerations associated with systems that blur the lines between initial sales and subsequent repurchases through net-settlement methodologies.

The regulatory architecture in accordance with an embodiment supports accountability through immutable audit trails spanning both transactions, with append-only database records that preserve relationships while maintaining technical independence for accounting and compliance purposes. Each audit record stores cryptographic hashes of previous records, creating verifiable chains of transaction events resistant to tampering while supporting regulatory examination requirements.

The user wallet management system in accordance with an embodiment implements a credit and withdrawal architecture that maintains the separation principle of the dual-transaction model while providing seamless user experiences. The wallet system processes direct credits through the internal ledger system when repurchase offers are accepted, with no immediate involvement of external payment processors.

The wallet infrastructure in accordance with an embodiment maintains persistent WebSocket connections using a publish-subscribe architecture to provide real-time status updates throughout both transaction flows. The WebSocket server pushes immediate notifications when offers are initiated, when configurable countdowns begin, and when wallet credits are completed, ensuring users maintain complete visibility into their transaction status.

Withdrawal processing in accordance with an embodiment utilizes STRIPE Connect only when users explicitly initiate transfers from their internal wallets to external bank accounts or debit cards. At this point, money moves from the client-managed account to the payment processor platform balance and finally to the user's external financial account, maintaining the clear separation between the internal ledger system and external payment processing.

The wallet credit processing workflow in accordance with an embodiment follows a strict state machine implementation where offer acceptances trigger the creation of wallet transaction records in initiated status before processing the ledger operations. The system employs error handling with automatic retry logic for failed operations, with each state transition generating dedicated event handlers that update associated records and provide user notifications through optimized communication channels.

User notification systems in accordance with an embodiment implement priority-based routing algorithms that select optimal communication channels based on user preferences and interaction history, including WebSocket connections for real-time updates when users are online, with fallback systems including push notifications, email, and in-app messaging. This notification architecture ensures users maintain complete awareness of their wallet status and transaction progress throughout the dual-transaction process while preserving the architectural integrity of the separated financial events.

The pack-level atomicity enforcement architecture in accordance with an embodiment represents a critical technical innovation that ensures the integrity of the pack as an indivisible transactional unit throughout the entire system lifecycle. This multi-layered enforcement mechanism addresses the significant technical complexities and user experience inconsistencies that arise in systems permitting fractured ownership of pack contents, providing a robust solution that maintains transactional coherence from initial purchase through final repurchase offer acceptance.

The foundational layer of pack-level atomicity enforcement in accordance with an embodiment is implemented through database schema design utilizing foreign key constraints that create inextricable linkages between individual card records and their parent pack instances. The system implements a relational framework where individual cards are structured within the database such that each card record contains a mandatory packId foreign key field, as would be readily understood by those skilled in the art, that prevents orphaned card records, making it technically impossible to process individual cards without reference to their complete pack.

The database schema in accordance with an embodiment implements atomic integrity constraints through cascading relationships including ON DELETE CASCADE and ON UPDATE CASCADE constraints that ensure referential integrity across all pack-related operations. Each card record in the Card table includes fields such as SlabPackStatus, SlabPackSeriesId, SlabPackTierId, and SlabPackComponentId, nomenclature that would be readily understood by those skilled in the art, that establish relationships with pack metadata while maintaining the fundamental constraint that no card can exist independently of its pack context.

The SlabPackSeries table in accordance with an embodiment contains fields for status, creation date, category associations, cards per pack counts, remaining packs, and state flags that control series visibility and editability, with foreign key relationships between these tables enabling tracking of inventory and series management while enforcing pack-level integrity. The SlabPackCategory table defines product groupings through name, description, and tier assignment fields, while the SlabPackTier table manages pricing information and inventory thresholds, all interconnected through foreign key constraints that preserve the atomicity of pack operations.

The inventory management system in accordance with an embodiment further reinforces pack-level atomicity through database triggers that validate all transaction attempts against a pack_integrity check that fails if any operation would result in partial pack selection. These triggers implement business rule validation at the database level, ensuring that even direct database operations cannot violate the pack-level atomicity requirements that form the core of the repurchase architecture.

The application programming interface (API) architecture in accordance with an embodiment implements a second layer of pack-level atomicity enforcement through deliberate endpoint design that structurally prevents individual card selection requests from reaching the business logic layer. All endpoints related to repurchase offers explicitly reject requests containing individual card identifiers, instead requiring a complete pack identifier for any sell-back transaction.

The RESTful API design in accordance with an embodiment follows a resource model where packs, not individual cards, serve as the transactional resources for offer operations, structurally preventing partial selection through the API route design. The system exposes endpoints that accept POST requests containing packId, userId, and slabSafeEnabled parameters for purchase operations, while repurchase endpoints implement payload validation middleware that verifies the atomicity of the transaction request before allowing it to proceed to the business logic layer.

The API architecture in accordance with an embodiment is divided into admin BackStage and user-facing FrontStage endpoints, providing control over all aspects of the system while maintaining appropriate access levels and enforcing pack-level constraints at every interaction point. These endpoints implement JWT authentication and idempotency keys to prevent duplicate transactions while maintaining strict validation rules that ensure pack atomicity cannot be compromised through API manipulation.

The offer generation and acceptance endpoints in accordance with an embodiment manage the time-sensitive configurable offer period through specialized sub-routes that calculate offers using the dynamic formula max(0.8×packPrice, 0.9×aggregateEV) and trigger the second discrete transaction only for complete pack units. The endpoints implement error handling with standardized response codes and logging to maintain transaction integrity throughout the dual-transaction process while preserving pack-level atomicity requirements.

The user interface implementation in accordance with an embodiment provides the third layer of pack-level atomicity enforcement through carefully designed controls that prevent users from manipulating interface elements to enable individual card selection. The offer acceptance modal renders cards as a visually cohesive unit with a single action button applicable to the entire pack rather than providing selection controls for individual cards.

The React and TypeScript implementation in accordance with an embodiment ensures users cannot manipulate the Document Object Model to enable individual card selection through client-side interface modifications. The system implements specialized front-end validation logic that monitors for unauthorized interface state changes and automatically reverts any attempts to modify the pack-level presentation to individual card selection interfaces.

The user interface in accordance with an embodiment prominently displays that all cards revealed from the pack must be sold together as a single unit if the offer is accepted, with visual design elements specifically chosen to reinforce the pack-level nature of the transaction. The interface provides clear indication through typography, color coding, and layout design that the repurchase decision applies to the complete pack contents without exception.

The offer modal components in accordance with an embodiment implement React state management patterns that maintain pack-level data structures throughout the user interaction lifecycle, preventing state fragmentation that could lead to individual card selection capabilities. The configurable countdown timer displays prominently within the modal interface, emphasizing the time-limited nature of the pack-level offer while maintaining visual cohesion that reinforces the atomic transaction concept.

The multi-layered approach in accordance with an embodiment creates redundant enforcement mechanisms that ensure pack-level atomicity cannot be compromised at any level of the system architecture. The combination of database constraints, API design limitations, and user interface controls creates a robust defense-in-depth strategy that maintains pack integrity even under exceptional circumstances or attempted system manipulation.

The system architecture in accordance with an embodiment implements state validation at every tier, with each layer performing independent verification of pack-level atomicity before allowing operations to proceed. The database layer validates foreign key relationships and referential integrity, the API layer validates request structure and payload completeness, and the user interface layer validates user interaction patterns and state consistency.

The technical architecture in accordance with an embodiment maintains audit trails that track all attempts to violate pack-level atomicity, providing diagnostic capabilities for system monitoring and security analysis. These audit mechanisms record attempted individual card selections, API requests for partial pack operations, and user interface anomalies that might indicate manipulation attempts.

The enforcement architecture in accordance with an embodiment extends to the WebSocket-based real-time communication system, which implements message validation protocols that ensure all real-time updates maintain pack-level consistency. The persistent bidirectional communication channels validate message integrity and pack atomicity before transmitting updates to connected client devices, preventing real-time data corruption that could compromise the pack-level transaction model.

The multi-layered enforcement system in accordance with an embodiment provides significant operational advantages over systems that permit fractured ownership, including simplified inventory tracking, consistent user experiences, and reduced technical complexity in transaction processing. The pack-level atomicity eliminates the need for complex partial-transaction rollback mechanisms, fractional inventory management systems, and the associated database performance implications of tracking individual card ownership states within pack contexts.

This technical approach in accordance with an embodiment ensures that at every level of the system architecture, from database constraints through schema design, API endpoint implementation, and user interface controls, the pack-level sale requirement is enforced, maintaining the integrity of the pack as an indivisible unit throughout the offer process while providing the superior user experience and operational efficiency that distinguishes the present invention from competitor systems that allow individual card selection and the associated technical and experiential complications.

The dynamic inventory and transparency system in accordance with an embodiment represents a real-time data management and communication architecture that provides immediate synchronization of inventory changes, odds calculations, and user interface updates across distributed client devices. This system addresses the fundamental market problems of opacity and static information presentation that characterize competitor platforms, implementing a technically advanced solution that maintains complete transparency while preserving market integrity through precise inventory control mechanisms.

The real-time odds calculation engine in accordance with an embodiment implements a continuous monitoring and computation system that executes immediate recalculation operations whenever inventory changes occur within the platform. The system maintains a primary database cluster that stores current card inventory, transaction history, and market analysis data, with a dedicated calculation engine that continuously monitors inventory changes and executes the odds recalculation algorithm whenever a card acquisition occurs.

The technical implementation in accordance with an embodiment factors in remaining card quantities, historical transaction patterns, and target distribution rates to generate updated odds values that reflect the precise current state of the inventory. The algorithm in accordance with an embodiment employs a mathematical framework that accounts for the removal of acquired items and the addition of replacement items, ensuring that the displayed probabilities remain mathematically accurate at all times.

The calculation process in accordance with an embodiment utilizes processing nodes that execute odds calculations and inventory updates triggered by collectible item acquisitions, with these processing nodes comprising an odds calculation engine continuously monitoring inventory changes, an inventory manager coordinating database updates, local caches maintaining frequently accessed data, and periodic synchronization mechanisms with the primary database cluster.

The system in accordance with an embodiment implements a distributed database architecture that utilizes horizontal sharding based on card series to optimize query performance across large card collections while maintaining ACID compliance for all transactions. The odds calculation engine interfaces with this distributed architecture through specialized query optimization algorithms that minimize computational latency while ensuring mathematical precision in the recalculated odds values.

Each odds recalculation event in accordance with an embodiment triggers a cascading update process that validates the mathematical consistency of all related probability calculations across the entire series, implementing error-checking algorithms that prevent mathematical inconsistencies that could compromise the integrity of the transparent odds display system.

The continuous replenishment architecture in accordance with an embodiment implements an automated inventory management system designed to maintain a plurality of collectible items per series, with immediate replacement of each acquired collectible item with a fresh collectible item to maintain consistent inventory levels. This mechanism addresses the technical challenge of preserving statistical validity while providing dynamic content updates that maintain user engagement and market excitement.

The replenishment system in accordance with an embodiment monitors inventory levels of collectible items against predefined thresholds, automatically replenishing a series with replacement collectible items when inventory falls below predetermined thresholds. The technical implementation utilizes worker processes that execute at configurable intervals to maintain accurate inventory counts across all series and categories, with automated triggers that initiate replenishment operations whenever threshold conditions are detected.

The system in accordance with an embodiment employs a SlabPackQueueRefillerDispatcherWorker as would be readily understood by those skilled in the art that runs every 30 seconds to identify series that need refilling and dispatches jobs to maintain accurate inventory levels. This worker system implements a state machine to manage the lifecycle of inventory series, defining distinct states including hidden, editable, sold_out, sold_out_editable, and active to ensure proper synchronization between the physical inventory and digital representations.

The replenishment mechanism in accordance with an embodiment automatically calculates updated odds based on current inventory levels and generates unique identifiers for new cards when thresholds are reached. The system in an exemplary embodiment implements a Fisher-Yates shuffle algorithm for random collectible item selection within each tier while maintaining transparent odds display for each individual collectible item, ensuring that the replacement process preserves the statistical integrity of the series composition.

The technical architecture in accordance with an embodiment maintains foreign key relationships between the SlabPackSeries table and related components, with specialized fields including numPremiumCardsPerPack, numNonPremiumCardsPerPack, and remainingPacks that enable the worker processes to accurately assess inventory status and trigger appropriate replenishment actions as would be readily understood by those skilled in the art. Database-level triggers and validation procedures ensure that replenishment operations maintain referential integrity while preserving the mathematical validity of the odds calculations.

The WebSocket-based communication infrastructure in accordance with an embodiment establishes persistent bidirectional communication channels between the computing system and client devices, enabling immediate transmission of inventory changes, odds updates, and transaction status information to all connected users. This real-time communication system eliminates the latency and bandwidth inefficiencies associated with traditional polling-based approaches while providing immediate synchronization across distributed client interfaces.

The system in accordance with an embodiment employs WebSocket protocols to enable real-time bidirectional communication between the server and client interfaces, with the WebSocket connection pushing immediate updates to all connected client interfaces whenever inventory changes occur, ensuring odds displays remain synchronized across the platform. This technical implementation eliminates latency issues present in traditional polling-based systems while providing immediate user feedback for all platform interactions.

The connection manager in accordance with an embodiment implements an event-driven architecture where inventory changes trigger immediate notifications to all connected clients. The persistent bidirectional communication channels comprise WebSocket connections implementing connection handlers maintaining persistent communication pathways with automatic reconnection protocols, an event-driven architecture for inventory change notifications triggered by acquisition of collectible items, and message queuing to prevent data loss during disconnections with dedicated queues for collectible item inventory updates.

The WebSocket implementation in accordance with an embodiment maintains persistent connections using a publish-subscribe architecture to provide real-time status updates throughout transaction flows, with the WebSocket server pushing immediate notifications when offers are initiated, when configurable countdowns begin, and when wallet credits are completed. This notification system ensures users maintain complete visibility into their transaction status while preserving the distributed architecture's data consistency.

The technical infrastructure in accordance with an embodiment implements connection resilience through automatic reconnection protocols that detect connection failures and reestablish communication pathways without data loss, utilizing message queuing systems that buffer updates during temporary disconnections and replay them upon reconnection to maintain state consistency across all client devices.

The checklist display system in accordance with an embodiment provides transparency through the presentation of complete item inventories with individual acquisition probabilities for each specific collectible item within a series. This transparency architecture addresses the opacity problems that characterize competitor platforms, many of which display only top-tier items or provide odds by value ranges rather than specific card probabilities.

The system in accordance with an embodiment dynamically updates the digital interface to reflect inventory and odds changes, implementing real-time synchronization of inventory data and odds calculations across distributed client interfaces while maintaining transparent odds display for collectible item acquisition. The user interface layer presents real-time display components that show current inventory status, individual item probabilities, and historical acquisition data in a format that enables informed consumer decision-making.

The checklist implementation in accordance with an embodiment displays each card within the system along with specific odds detailing the likelihood of obtaining each card, with this level of detail provided for every card included in the system to ensure consumers are fully informed about their potential acquisitions. The enhanced transparency feature allows consumers to view detailed information about each card before making a purchase, with the system displaying each card along with specific odds calculated based on a proprietary algorithm that takes into account factors such as card rarity, demand, and previous acquisition rates.

The technical architecture in accordance with an embodiment implements specialized rendering algorithms that organize checklist information in user-friendly formats, with responsive design elements that maintain readability across mobile and desktop devices while presenting complex probability data in intuitive visualizations. The system employs dynamic sorting and filtering capabilities that enable users to organize checklist information by probability, value, rarity, or other relevant characteristics.

The real-time updating mechanism in accordance with an embodiment ensures that checklist displays reflect current inventory status immediately following any acquisition or replenishment event, with WebSocket-pushed updates modifying displayed probabilities within milliseconds of inventory changes. This immediate responsiveness provides users with current, actionable information that enables confident purchasing decisions while maintaining the mathematical integrity of all displayed probability calculations.

The checklist system in accordance with an embodiment provides significant competitive advantages over platforms that display only top hits or provide odds by value ranges, implementing a transparency model that builds consumer trust while demonstrating the technical sophistication of the underlying inventory management and calculation systems. This transparency architecture represents a key differentiating feature that establishes the platform as a superior alternative to less transparent competitor offerings while maintaining the operational efficiency necessary for scalable platform operation.

The user interface and experience architecture in accordance with an embodiment implements a suite of gamification and presentation technologies designed to replicate and enhance the physical collectible opening experience while providing seamless integration with live-streaming platforms and alternative interface paradigms. This technical implementation provides the foundation for dependent claims specifically targeting competitor approaches while demonstrating the breadth and adaptability of the underlying inventive system.

The pack opening animation system in accordance with an embodiment utilizes front-end technologies to create immersive experiences that replicate the anticipation and excitement associated with physical pack opening rituals. The system implements advanced graphical animations and interactive elements integrated into the website application, in an exemplary embodiment through TypeScript and Threejs 3D models, which allow for smooth, realistic movements and sounds that enhance the user's sensory experience.

The technical implementation in accordance with an embodiment triggers a series of animations that replicate the visual and tactile sensations of tearing open a pack when a customer initiates the opening of a digital pack. These animations are crafted using rendering technologies that animate the opening process and display the cards in a user-friendly layout, with customers then able to review each card's details presented with high-resolution images and relevant information such as rarity and other pertinent attributes.

The gamification architecture in accordance with an embodiment extends beyond basic animations to implement engagement mechanisms including achievement systems, progress tracking, and reward structures that maintain user engagement throughout the platform experience. The system in an exemplary embodiment utilizes React components that render dynamic progress indicators, streak counters, and milestone celebrations that activate during and after pack opening sequences.

The animation rendering pipeline in accordance with an embodiment implements a multi-layered visual presentation system that begins with pack selection confirmation and progresses through opening sequences, card revelation phases, and post-reveal interaction periods. Each phase utilizes specialized animation libraries and custom WebGL shaders to provide visually compelling experiences optimized for both mobile and desktop devices.

The system in accordance with an embodiment implements dynamic sound integration synchronized with visual animations, utilizing Web Audio API to provide realistic audio feedback that corresponds to physical pack opening sounds, card reveal notifications, and achievement unlocks. The audio system dynamically adjusts volume and spatial positioning based on user preferences and device capabilities while maintaining synchronization with the visual animation timeline.

The live-streaming integration architecture in accordance with an embodiment provides support for real-time broadcast integration, including for influencer-hosted breaking sessions. The system in an exemplary embodiment implements specialized WebRTC protocols that enable seamless integration with popular streaming platforms while maintaining the synchronized reveal experience that forms the core of the inventive system.

The technical implementation in accordance with an embodiment establishes persistent bidirectional communication channels that coordinate between the pack opening system and external streaming infrastructure. The system in an exemplary embodiment utilizes WebSocket connections to maintain real-time synchronization between the pack opening interface and streaming overlay systems, enabling hosts to control pack opening sequences while maintaining viewer engagement through interactive elements.

The streaming integration layer in accordance with an embodiment implements specialized API endpoints that provide streaming platforms with access to pack opening events, user interaction data, and real-time inventory updates. These endpoints enable streaming hosts to present live checklist information, current odds displays, and pack availability status directly within their broadcast interfaces while maintaining connection to the underlying inventory management system.

The synchronized reveal mechanism in accordance with an embodiment coordinates pack opening animations with streaming platform requirements, enabling hosts to control the timing and presentation of card reveals while maintaining the atomic pack-level transaction model that distinguishes the present system from competitor approaches. The system in an embodiment implements buffer management protocols that ensure smooth streaming performance while preserving the real-time transparency features that provide competitive advantages.

The live interaction framework in accordance with an embodiment provides chat integration, viewer polling capabilities, and real-time engagement metrics that enable streaming hosts to maintain audience participation throughout the pack opening experience. The system implements moderation tools, spam prevention mechanisms, and engagement tracking that optimize the streaming experience while maintaining the underlying transaction integrity.

The vending machine simulation interface in accordance with an exemplary embodiment provides an alternative presentation paradigm that mimics physical vending machine interactions while maintaining the underlying pack-based transaction architecture and transparency features that distinguish the present system. This implementation in an embodiment may provide or suggest vending machine metaphors in implementation.

The technical implementation in accordance with an embodiment utilizes CSS3 animations and JavaScript interaction handlers to create realistic vending machine interfaces including selection mechanisms, payment confirmation displays, and product dispensing animations. The system implements touch and click interaction patterns that correspond to physical vending machine button presses while maintaining the underlying pack-level atomicity enforcement through specialized user interface controls.

The vending machine interface architecture in accordance with an exemplary embodiment implements realistic product selection displays showing available pack types arranged in simulated vending slots, with each slot displaying current availability, pricing information, and estimated odds calculations. The interface utilizes dynamic lighting effects and product highlighting to guide user attention while maintaining complete transparency regarding pack contents and acquisition probabilities.

The dispensing animation system in accordance with an exemplary embodiment provides realistic product delivery sequences that correspond to physical vending machine operations, including slot illumination, mechanical sound effects, and product movement animations that culminate in pack opening sequences. These animations bridge the gap between the vending machine metaphor and the underlying pack reveal system while maintaining user engagement and anticipation.

The payment integration architecture in accordance with an embodiment seamlessly incorporates the dual-transaction financial model within the vending machine interface paradigm, presenting payment confirmation and premium selection options through simulated coin insertion and bill acceptance animations. The interface maintains clear visual feedback regarding transaction status while preserving the technical separation between initial purchase and subsequent repurchase transactions.

The virtual claw machine interface implementation in accordance with an exemplary embodiment provides a game-of-skill presentation layer that maintains the underlying pack-based transaction model while offering an alternative user interaction paradigm. The system in an embodiment implements realistic physics simulation and control mechanisms while preserving the pack-level atomicity and transparency features that distinguish the present invention. The technical architecture in accordance with an embodiment utilizes physics engines and 3D rendering libraries to create realistic claw machine simulations including claw movement mechanics, prize positioning algorithms, and grab sequence animations. The system in an exemplary embodiment implements user input handling for directional controls, claw operation commands, and timing mechanisms that provide authentic claw machine experiences while maintaining deterministic outcomes based on the underlying pack purchase transaction. The physics simulation framework in accordance with an embodiment implements realistic claw machine mechanics including claw strength variations, prize weight simulation, and drop probability calculations that create engaging user experiences while maintaining the guaranteed pack delivery that forms the core of the inventive system. The simulation preserves user agency in the claw operation experience while ensuring successful pack acquisition based on the completed purchase transaction. The prize presentation system in accordance with an embodiment arranges pack options within the simulated claw machine environment using dynamic positioning algorithms that maintain visual appeal while ensuring all available packs remain accessible through claw operation. The system in an exemplary embodiment implements realistic prize physics including sliding, stacking, and collision behaviors that enhance the authenticity of the claw machine experience. The success guarantee mechanism in accordance with an embodiment ensures that claw operations initiated following completed purchase transactions always result in successful pack acquisition, maintaining the pack-level transaction integrity while providing engaging user interaction experiences. The system implements adaptive difficulty algorithms that adjust claw mechanics to ensure purchase fulfillment while preserving the entertainment value of the claw machine simulation. The multi-device optimization in accordance with an embodiment provides consistent claw machine experiences across mobile touchscreen interfaces and desktop mouse controls, implementing adaptive control schemes that maintain intuitive operation regardless of input method. The system utilizes responsive design principles and adaptive physics parameters that optimize the claw machine experience for each device category while maintaining visual fidelity and interaction responsiveness.

Each of these user interface implementations in accordance with an embodiment maintains integration with the underlying pack-value repurchase system, dual-transaction financial architecture, and pack-level atomicity enforcement mechanisms that form the core inventive concepts of the present system. The interface paradigms serve as presentation layers that enhance user engagement while preserving the technical advantages and consumer protections that distinguish the present invention from competitor approaches that may utilize similar interface metaphors without equivalent underlying technical sophistication or consumer protection mechanisms.

The user interface architecture in accordance with various embodiments demonstrates the adaptability and breadth of the underlying technical system while providing specific implementation details that enable dependent claims targeting the diverse interface approaches employed by competitors throughout the digital collectibles marketplace.

The underlying inventive concepts of the pack-value based repurchase system and dual-transaction financial architecture in accordance with an embodiment demonstrate remarkable adaptability across diverse technological implementations and market approaches. In various examples, the system architecture supports numerous alternative embodiments that maintain the core inventive benefits while adapting to different technological paradigms, user interface preferences, and market requirements that characterize the rapidly evolving digital collectibles landscape.

For example, the system in accordance with an embodiment readily adapts to blockchain-based implementations that utilize distributed ledger technologies while preserving the fundamental pack-value calculation methodology and dual-transaction separation that distinguish the present invention from conventional approaches. The blockchain integration layer implements smart contracts that manage NFT tokens and validate ownership transfers, ensuring secure and verifiable tracking of card ownership while maintaining the connection between physical cards and their digital representations.

In accordance with a blockchain-based embodiment, the pack-value repurchase system operates through smart contract architectures deployed on public blockchains such as Polygon, Ethereum, or specialized trading card blockchain networks. The initial purchase transaction in accordance with this embodiment utilizes cryptocurrency payments processed through Web3 wallet integrations, with the pack purchase price recorded immutably on the blockchain through specialized smart contract functions that store the original transaction value in the native cryptocurrency denomination. The dual-transaction architecture in accordance with a blockchain embodiment maintains complete separation between the initial purchase and subsequent repurchase operations while leveraging the transparency and immutability advantages of distributed ledger technology. The first transaction involves the minting of NFT tokens representing the pack contents, with each NFT containing metadata that references the original purchase price recorded in the smart contract storage. The pack-level atomicity enforcement in accordance with this embodiment utilizes smart contract logic that prevents individual NFT transfers without the complete pack collection, implementing on-chain validation that mirrors the database-level constraints described in the primary embodiment.

The repurchase transaction in accordance with a blockchain embodiment executes through a separate smart contract function that calculates the offer price using the identical formula max(0.8×packPrice, 0.9×aggregateEV) while accessing on-chain price oracles for current market valuations. Upon offer acceptance, the smart contract automatically transfers the calculated cryptocurrency amount to the user's wallet while updating the NFT ownership records to reflect the pack repurchase.

The system architecture in accordance with an embodiment encompasses alternative implementations that utilize internal, non-withdrawable currency systems while maintaining the superior consumer protection mechanisms that distinguish the present invention from platforms limited to closed-loop economies. In accordance with an embodiment utilizing internal currency systems, the pack-value repurchase mechanism operates through specialized virtual currency frameworks where users accumulate platform-specific tokens through pack purchases and repurchase transactions. The dual-transaction architecture in accordance with this embodiment maintains complete separation between the initial fiat currency purchase processed through external payment gateways and the subsequent internal currency credit transactions that occur following offer acceptance.

The technical implementation in accordance with this embodiment utilizes dedicated database schemas that track virtual currency balances, transaction histories, and conversion rates between fiat currency and internal tokens. The pack-value calculation algorithm operates identically to the primary embodiment, generating offers based on the original pack purchase price while denominating the results in internal currency units. The system maintains the guaranteed value floor protection through internal currency equivalent values, ensuring users receive predictable minimum returns despite the non-withdrawable nature of the internal currency system.

The competitive advantages in accordance with such embodiment include the ability to provide pack-value protection within closed-loop economies while offering superior transparency through complete checklists and per-item acquisition probabilities. The system implements real-time inventory management and dynamic odds calculation mechanisms identical to the primary embodiment, utilizing WebSocket-based communication protocols to maintain synchronized displays of internal currency values and pack availability across distributed client interfaces.

The system in accordance with an embodiment supports extensive customization of user interface paradigms and reveal mechanisms while preserving the underlying pack-value repurchase architecture and dual-transaction financial processing that provide the core inventive benefits. The gamification implementations encompass diverse presentation styles including traditional pack opening animations, claw machine simulations, vending machine interfaces, and live-streaming integration capabilities.

The claw machine interface implementation in accordance with an embodiment provides realistic physics simulation and control mechanisms while maintaining deterministic outcomes based on completed purchase transactions. The system utilizes physics engines and 3D rendering libraries to create authentic claw machine experiences including claw movement mechanics, prize positioning algorithms, and grab sequence animations. The technical architecture ensures that claw operations initiated following completed purchase transactions always result in successful pack acquisition, maintaining pack-level transaction integrity while providing entertaining user interaction experiences.

The vending machine simulation interface in accordance with an embodiment implements realistic product selection displays, payment confirmation sequences, and product dispensing animations that culminate in pack opening sequences. The interface utilizes CSS3 animations and JavaScript interaction handlers to create vending machine experiences including selection mechanisms, payment confirmation displays, and product delivery sequences that maintain user engagement while preserving the underlying pack-based transaction architecture.

The live-streaming integration capabilities in accordance with an embodiment provide support for real-time broadcast integration through WebRTC protocols that enable seamless coordination between pack opening systems and external streaming infrastructure. The system establishes persistent bidirectional communication channels that coordinate between pack opening interfaces and streaming overlay systems, enabling hosts to control pack opening sequences while maintaining viewer engagement through interactive elements that preserve the real-time transparency features.

Advanced gamification mechanisms in accordance with an embodiment include achievement systems, progress tracking, reward structures, and milestone celebrations that activate during and after pack opening sequences. The system implements dynamic sound integration synchronized with visual animations, utilizing Web Audio API to provide realistic audio feedback corresponding to physical pack opening sounds, card reveal notifications, and achievement unlocks while maintaining compatibility with diverse interface paradigms.

The system in accordance with an embodiment accommodates diverse premium structures and guarantee levels that extend beyond the baseline 10% premium option while maintaining the fundamental pack-value protection mechanism that distinguishes the present invention from competitor approaches based on individual card fair market value. The flexible premium architecture enables market-responsive pricing strategies while preserving the guaranteed value floor protection that transforms speculative purchases into insured transactions.

Tiered premium structures in accordance with an embodiment implement multiple protection levels including basic, enhanced, and premium guarantee options that provide progressively higher percentage returns based on the original pack purchase price. The basic tier in accordance with this embodiment provides the standard 80% pack price guarantee without additional premium charges, while enhanced and premium tiers offer 85% and 90% pack price guarantees respectively in exchange for proportionally scaled premium payments during initial checkout.

Variable premium calculations in accordance with an embodiment implement dynamic premium pricing based on pack value, market conditions, and historical risk assessments. The system utilizes machine learning algorithms that analyze transaction patterns, market volatility, and pack performance data to automatically adjust premium percentages while maintaining the guaranteed minimum return calculations based on pack purchase prices rather than volatile individual card valuations.

Time-sensitive premium structures in accordance with an embodiment provide promotional guarantee levels during specific market periods, seasonal campaigns, or inventory clearance events. The system implements specialized pricing engines that automatically adjust both pack prices and premium structures while preserving the pack-value calculation methodology that ensures predictable consumer protection regardless of temporal pricing variations.

Alternative guarantee calculation methods in accordance with an embodiment include sliding scale guarantees based on pack price ranges, category-specific guarantee levels optimized for different collectible types, and hybrid models that combine pack-value guarantees with performance bonuses based on aggregate estimated values. These variations maintain the core inventive concept of pack-level financial protection while providing market flexibility that addresses diverse consumer preferences and risk tolerances.

The system in accordance with an embodiment provides integration capabilities with external grading services including PSA, BGS, SGC, and other professional authentication organizations while maintaining the pack-level transaction integrity and dual-transaction financial architecture that characterize the present invention. The grading service integration enhances the transparency and authentication features of the system while preserving the pack-value calculation methodology that provides superior consumer protection.

The grading service integration architecture in accordance with an exemplary embodiment implements direct API connections to Professional Sports Authenticator (PSA) systems that enable real-time grade verification, population reports, and market value updates. The system maintains synchronized records between internal card databases and PSA certification databases through unique PSA certification numbers that link physical cards to their grading records while preserving pack-level associations that support the atomic repurchase model.

The technical implementation in accordance with this embodiment includes specialized components for reading certification numbers, scanning physical card characteristics, generating cryptographic hashes, and validating ownership transfers through smart contracts or database systems that maintain verifiable connections between physical cards and their digital representations. The grading integration ensures secure and verifiable tracking of card authenticity while maintaining pack-level transaction atomicity.

Automated grade verification systems in accordance with an embodiment employ computer vision technology and machine learning algorithms to evaluate physical cards and validate grading certifications. The system captures high-resolution scans of cards and processes them through verification algorithms that assess characteristics including condition, authenticity, and proper categorization while maintaining pack-level integrity throughout the authentication process.

Dynamic valuation integration in accordance with an embodiment incorporates real-time market data from grading services into the aggregateEV calculations used in the pack-value formula max(0.8×packPrice, 0.9×aggregateEV). The system interfaces with grading service APIs to obtain current population reports, recent sales data, and market trend information that enhance the accuracy of estimated value calculations while preserving the guaranteed pack-price minimum that provides consumer protection regardless of market volatility.

Multi-service integration capabilities in accordance with an embodiment enable simultaneous connections to multiple grading organizations through standardized API interfaces that normalize grading scales, certification formats, and population data across different authentication providers. The system implements confidence-weighted reconciliation algorithms that process conflicting valuations from different grading services while maintaining the pack-value protection mechanism that distinguishes the present invention from systems dependent on volatile individual card market prices.

The architecture in accordance with an embodiment the present invention demonstrates the adaptability and broad applicability of the core inventive concepts while maintaining the fundamental consumer protection mechanisms and technical advantages that distinguish the system. Each alternative implementation preserves the pack-value based repurchase methodology, dual-transaction financial separation, and pack-level atomicity enforcement that provide superior user experiences and regulatory compliance advantages across diverse technological platforms and market segments within the rapidly evolving digital collectibles industry.

The technical architecture implementation in accordance with an embodiment provides demonstrable competitive advantages through specific operational scenarios that highlight the superior consumer protection, transparency, and liquidity features of the present invention. These advantages are quantifiable through illustrations of the substantial financial and experiential benefits provided by the pack-value based repurchase system and dual-transaction financial architecture relative to other attempts.

The pack-value based repurchase system in accordance with an embodiment provides substantial risk mitigation advantages that are readily demonstrated through specific financial scenarios comparing outcomes under the present system. These scenarios illustrate the concrete consumer protection benefits achieved through the guaranteed value floor mechanism that distinguishes the present invention from conventional market approaches.

In accordance with an embodiment, a representative scenario involves a user purchasing a $500 pack who receives cards with a combined estimated value of $200. Under the present system with premium protection selected during initial checkout, the user would receive a buyback offer of $400, calculated as 80% of the original $500 pack purchase price according to the formula max(0.8×packPrice, 0.9×aggregateEV). This offer provides the user with a total loss of only $100 on the original $500 investment, representing an 80% value recovery that transforms a potentially catastrophic loss into a manageable outcome.

In contrast, the same scenario under an alternative approach would result in a buyback offer of approximately $162, calculated as 90% of the $200 fair market value minus the typical 6% processing fee. This alternative approach results in a total loss of $338 for the user, representing only a 32.4% value recovery and demonstrating the substantial consumer protection disadvantage of individual card FMV-based systems compared to the pack-value architecture approach of the present system.

The technical implementation in accordance with an embodiment that enables this superior protection operates through the pack-value calculation engine that maintains immutable records of the original purchase price including any premium selected during checkout. The system's database architecture preserves this purchase price data as the foundational input to the offer calculation algorithm, ensuring that users receive predictable minimum returns regardless of the volatility in individual card market valuations that can dramatically affect competitor systems.

Additional scenarios in accordance with an embodiment further demonstrate the risk mitigation advantages across different pack price points and outcome scenarios. A user purchasing a $100 pack with premium protection who receives cards valued at $30 would receive an $80 buyback offer under the present system compared to approximately $24 under alternative FMV approaches, representing the difference between a manageable 20% loss and a devastating 76% loss.

The system architecture in accordance with an embodiment extends these risk mitigation benefits through the dual-transaction financial model that provides immediate liquidity without the delays and uncertainties associated with secondary market transactions required under conventional approaches. Users receive instant credit to their platform wallets upon offer acceptance, enabling immediate reinvestment or withdrawal without the complications of finding buyers, negotiating prices, or managing shipping logistics that characterize traditional collectibles markets.

The transparency advantages provided by the present system in accordance with an embodiment represent a fundamental improvement over alternative approaches that would limit user access to inventory and probability information. The complete checklist display associated with an embodiment of the present invention with per-item acquisition probabilities provides users with actionable information that enables informed purchasing decisions while building consumer trust through disclosure of all relevant product information.

The technical implementation in accordance with an embodiment displays every card within each series along with specific odds calculated in real-time based on current inventory levels and the continuous replenishment mechanism that maintains exactly 100 collectible items per series. This transparency contrasts sharply with alternative approaches that would display only "top hits" or others that would provide limited visibility into pack contents through a live-streaming format.

Other approaches considered in accordance with the market analysis provide odds by value ranges rather than specific card probabilities, displaying information such as "6% chance of receiving a $50-$100 card" without identifying which specific cards fall within those ranges. Such approaches leave users unable to assess their actual likelihood of receiving specific desired items, creating uncertainty that the present system eliminates through its granular probability display for each individual card.

The real-time updating mechanism in accordance with an embodiment of the present invention in contrast ensures that displayed odds reflect current inventory status immediately following any acquisition or replenishment event, utilizing WebSocket-based communication protocols to synchronize probability displays across all connected client devices. This immediate responsiveness contrasts with other approaches that would demonstrate static displays that remain unchanged for extended periods during testing.

The technical architecture in accordance with an embodiment that enables this superior transparency operates through the distributed database system that maintains records of current inventory levels, transaction histories, and market analytics data. The odds calculation engine continuously monitors inventory changes and executes recalculation algorithms whenever collectible item acquisitions occur, factoring in remaining quantities, historical transaction patterns, and target distribution rates to generate updated probability values.

The enhanced transparency feature in accordance with an embodiment extends beyond basic probability display to include card descriptions, high-resolution images, historical information, and authentication data that enable users to make fully informed decisions about potential acquisitions. This level of detail contrasts with approaches that would display minimal information about pack contents or would require user registration to view basic pack details.

The liquidity advantages provided by the dual-transaction financial architecture in accordance with an embodiment represent a significant differentiator that addresses fundamental limitations in alternatively considered approaches that would restrict user access to accumulated value through non-withdrawable currency models or delayed payout mechanisms. The immediate posting of withdrawable credits to user wallets provides superior financial flexibility compared to closed-loop economies that limit user options.

The system in accordance with an embodiment processes repurchase offers through the internal ledger architecture that posts credits immediately to user wallets upon offer acceptance, with these credits being fully withdrawable as fiat currency through integration with external payment processors for withdrawal transactions. This immediate liquidity provision contrasts sharply with alternatively considered approaches that provide non-withdrawable credits that would only be used for additional purchases within a closed platform ecosystem. These approaches limit user financial flexibility and create potential liquidity concerns that the present system avoids through its withdrawable credit architecture.

The technical implementation in accordance with an embodiment that enables superior liquidity operates through the ledger-first design where repurchase transactions are processed entirely through internal ledger operations without involving external payment processors at the time of offer acceptance. This approach provides instant settlement while maintaining clear separation between the initial purchase transaction and subsequent repurchase event, offering both immediate liquidity and proper accounting separation for regulatory compliance purposes.

The withdrawal processing system in accordance with an embodiment utilizes STRIPE Connect only when users explicitly initiate transfers from their internal wallets to external financial accounts, maintaining the architectural separation between internal ledger operations and external payment processing while providing users with complete control over their accumulated value. This approach contrasts with other considered approaches that would delay withdrawals, impose additional fees, or restrict withdrawal methods in ways that limit user access to their accumulated value.

The financial architecture in accordance with an embodiment provides additional liquidity advantages through the elimination of secondary market complexities that characterize traditional collectibles transactions. Users who accept repurchase offers avoid the time delays, transaction costs, and uncertainties associated with finding buyers, negotiating prices, managing shipping logistics, and handling potential disputes that arise in peer-to-peer secondary market transactions.

The comparative analysis in accordance with an embodiment demonstrates that while competitors may offer superficially similar buyback programs, the combination of pack-value calculation methodology, immediate liquidity provision, and withdrawable credit architecture provides substantial practical advantages that distinguish the present system as a superior solution for consumers seeking predictable value recovery and financial flexibility in digital collectibles transactions.

The technical superiority of the present system in accordance with an embodiment extends beyond individual feature comparisons to encompass systemic advantages in operational efficiency, regulatory compliance, and user experience consistency that provide the platform with sustainable competitive advantages in the rapidly evolving digital collectibles marketplace. These advantages are quantifiable through direct operational metrics and user outcome comparisons that demonstrate the concrete and critical benefits of the inventive architecture described throughout the present patent application.

The technical implementation architecture in accordance with an embodiment encompasses a distributed computing infrastructure that provides the scalable, secure, and reliable foundation necessary to support the pack-value based repurchase system and dual-transaction financial architecture described throughout this disclosure.

The server-side architecture in accordance with an embodiment implements a microservices-based design pattern that provides scalability, maintainability, and fault tolerance for the critical business logic components of the system. The offer calculation microservices comprise specialized computational modules that execute the pack-value formula max(0.8×packPrice, 0.9×aggregateEV) through distributed processing nodes that maintain high availability and low latency response times even under heavy transaction loads.

The offer calculation microservices in accordance with an embodiment interface with the distributed database architecture through TypeScript and SQL transactions using TypeORM to maintain current pricing data for the aggregateEV calculations. These microservices implement confidence-weighted reconciliation algorithms that process market price data from verified sales platforms, professional grading assessments, historical transaction records, and real-time demand metrics to generate accurate estimated value calculations.

The payment processing integration modules in accordance with an embodiment provide secure interfaces to external payment gateways while maintaining the architectural separation required for the dual-transaction model. The system utilizes STRIPE Checkout for the initial purchase transactions, implementing webhook handling for various payment events including checkout.session.expired, checkout.session.completed, checkout.session.payment_succeeded, and checkout.session.payment_failed which would be readily understood by those skilled in the art. The integration follows server-side implementation patterns to prevent exposure of API keys on the client side while maintaining transaction metadata embedding for logical connection tracking between discrete financial events.

The real-time communication handlers in accordance with an embodiment implement WebSocket-based persistent bidirectional communication channels that enable immediate synchronization of inventory changes, transaction status updates, and user interface modifications across all connected client devices. The communication handlers utilize a publish-subscribe architecture that manages connection state, message queuing for disconnected clients, and automatic reconnection protocols that ensure data consistency across the distributed platform.

The database transaction managers in accordance with an embodiment coordinate complex multi-table operations while maintaining ACID compliance for all financial transactions and inventory updates. These managers implement specialized transaction patterns including optimistic locking with version control fields to prevent race conditions during concurrent transaction processing, error handling with automatic retry logic for failed operations, and configurable exponential backoff intervals for external service integrations. The transaction managers ensure atomicity across the dual-transaction architecture while preserving the logical relationships between separate financial events through metadata preservation protocols.

The client-side architecture in accordance with an embodiment implements a responsive web application framework utilizing TypeScript and React to provide consistent user experiences across desktop and mobile devices while supporting the complex real-time interaction patterns required for the pack-value repurchase system. The responsive design principles ensure optimal usability across diverse screen sizes and input methods while maintaining the visual clarity necessary for financial transaction interfaces.

The responsive web application architecture in accordance with an exemplary embodiment employs React components that render the repurchase offer modal with prominent configurable countdown timers, transparent pricing information displays, and clear transaction confirmation interfaces. The components implement state management patterns that maintain pack-level data structures throughout the user interaction lifecycle, preventing state fragmentation that could compromise the atomic transaction requirements.

The mobile application considerations in accordance with an embodiment encompass touch-optimized interface elements, adaptive layout algorithms that respond to device orientation changes, and streamlined navigation patterns that accommodate the constraints of mobile interaction paradigms. The mobile architecture implements specialized input handling for touch gestures, swipe navigation, and voice interaction capabilities while maintaining complete functional parity with desktop implementations.

The mobile-specific optimizations in accordance with an embodiment include progressive web application features that enable offline functionality for core interface elements, push notification capabilities that provide real-time transaction updates even when the application is not actively displayed, and adaptive performance tuning that adjusts animation complexity and data synchronization frequency based on device capabilities and network conditions.

The real-time update handling via WebSocket connections in accordance with an embodiment implements client-side connection management protocols that maintain persistent communication pathways with automatic reconnection logic, message acknowledgment systems that ensure delivery confirmation for critical updates, and local caching mechanisms that preserve application state during temporary network interruptions. The WebSocket implementation provides immediate reflection of inventory changes, offer status updates, and transaction confirmations across all connected client instances while maintaining synchronization with the server-side state management systems.

The security and compliance architecture in accordance with an embodiment implements protection mechanisms that safeguard user data, financial information, and transaction integrity throughout the dual-transaction processing lifecycle. The system employs industry-standard encryption techniques including SSL/TLS for data transmission and AES for data at rest, ensuring that all personal and financial information maintains confidentiality during processing and storage.

The data encryption and secure storage implementation in accordance with an embodiment utilizes cryptographic key management systems that rotate encryption keys on configurable schedules, implement secure key escrow procedures for disaster recovery scenarios, and maintain separation of duties for cryptographic operations. The storage architecture implements secure data handling protocols that ensure all sensitive information is processed according to privacy regulations while maintaining the audit trail requirements for financial compliance.

The anti-fraud mechanisms and transaction monitoring in accordance with an embodiment implement real-time risk assessment algorithms that analyze transaction patterns, user behavior analytics, and device fingerprinting to identify potentially fraudulent activities. The system employs machine learning models that continuously adapt to emerging fraud patterns while maintaining low false-positive rates that preserve legitimate user experiences. Transaction monitoring includes logging of all financial events, real-time alerting for suspicious activities, and automated response protocols that can temporarily restrict account access pending manual review.

The dual-transaction architecture security implementation in accordance with an embodiment provides specialized protections for the separation between initial purchase and subsequent repurchase transactions. The system employs transaction idempotency protection using unique cryptographic identifiers for each discrete financial event, tamper-resistant digital signatures that combine pack identifiers with offer amounts and timestamps, and cryptographic verification processes that validate user acceptance intent while preventing replay attacks or fraudulent acceptances.

The system architecture described throughout this detailed disclosure represents a fundamental advancement in digital collectibles transaction processing that addresses the core problems of financial risk, transparency, and liquidity that have historically limited consumer adoption and market growth in the collectibles industry. The invention in accordance with various embodiments combines the novel pack-value based repurchase methodology with the technically superior dual-transaction financial architecture to create a platform that transforms speculative collectible purchases into insured transactions while providing immediate liquidity and complete transparency to users.

The pack-value calculation engine provides guaranteed minimum returns based on the original purchase price rather than volatile individual item valuations, fundamentally altering the risk profile of collectible transactions and establishing a sustainable economic model that benefits both consumers and platform operators. The dual-transaction architecture maintains clear separation between purchase and repurchase events while providing immediate settlement through internal ledger operations, creating significant advantages in accounting, regulatory compliance, and user experience compared to conventional net-settlement approaches considered as alternatives.

The real-time inventory management and transparency systems ensure that users have access to complete, current information regarding available items and their acquisition probabilities, addressing the opacity problems that characterize less advanced competitor offerings. The pack-level atomicity enforcement prevents the technical complexities and user experience inconsistencies associated with fractured ownership models while simplifying inventory management and transaction processing throughout the platform lifecycle.

The technical implementation encompasses distributed computing architectures, real-time communication protocols, security measures, and responsive user interfaces that collectively enable the novel economic model while providing the scalability, reliability, and compliance necessary for commercial deployment. The invention demonstrates concrete improvements to computer functionality through automated transaction processing, real-time data synchronization, and user interface management that addresses problems specifically arising in networked computing environments rather than merely implementing abstract business concepts through conventional computer operations.

This technical solution in accordance with various embodiments of the invention provides the foundation for a new paradigm in digital collectibles transactions that prioritizes consumer protection, transparency, and immediate liquidity while maintaining the excitement and engagement that drive participation in collectibles markets, establishing a sustainable competitive advantage through the combination of novel economic modeling and superior technical implementation that distinguishes the present invention from existing market approaches and provides significant value to both consumers and platform operators in the rapidly evolving digital collectibles marketplace.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

We claim:

1. A system for managing salable item distribution with dynamic inventory transparency across a plurality of product tiers, comprising:

a data store configured with tier-specific inventory tracking structures that maintain independent inventory records for each tier of the plurality of product tiers, maintaining an inventory of salable items organized into the plurality of product tiers, wherein each tier is associated with distinct value-based selection criteria, and further wherein the tier-specific inventory tracking structures enable independent inventory operations for each tier;

one or more processors configured to:

detect a purchase transaction for at least one salable item from the inventory in a first tier of the plurality of product tiers;

in response to detecting the purchase transaction, automatically update inventory data for the first tier independently from inventory data of other tiers using tier-isolated data operations;

determine, within a sub-second timeframe, acquisition probabilities for salable items in the first tier based on the updated inventory data independently from acquisition probabilities for other tiers, and further wherein the acquisition probabilities are determined based on at least one of: current quantities of salable items within the first tier, historical transaction patterns, or target distribution rates; and transmit, via, the determined acquisition probabilities to a plurality of client devices for simultaneous display, wherein the one or more processors automatically transmit notifications of inventory changes to maintain real-time inventory synchronization across distributed client interfaces.

2. The system of claim 1, wherein the data store maintains a fixed quantity of salable items per tier through an automated replenishment process comprising monitoring inventory levels in each tier and, upon sale of a salable item from a given tier, automatically assigning a replacement salable item to the given tier to restore the fixed quantity.

3. The system of claim 1, wherein the persistent network connections comprise WebSocket connections or Server-Sent Events (SSE) channels maintained between a server and the plurality of client devices, and wherein the event-driven communication protocols transmit serialized inventory state objects comprising at least updated acquisition probabilities and remaining inventory counts for the first tier.

4. The system of claim 1, wherein the plurality of product tiers comprises at least a first tier, a second tier, and a third tier, each tier having a distinct price point and a distinct set of collectible items, and wherein the tier-specific inventory tracking structures comprise separate database partitions or indexed data structures for each tier such that inventory queries and updates for one tier do not affect inventory operations for other tiers.

5. The system of claim 1, wherein the determining acquisition probabilities comprises applying a weighted probability model that assigns each salable item within the first tier an acquisition probability proportional to a ratio of a remaining quantity of that salable item to a total remaining quantity of all salable items within the first tier, and wherein updated acquisition values sum to a value of one across all salable items within the first tier.

6. A system for managing salable item distribution with dynamic inventory transparency across a plurality of product tiers, comprising:

a data store configured with tier-specific inventory tracking structures that maintain independent inventory records for each tier of the plurality of product tiers, maintaining an inventory of salable items organized into the plurality of product tiers, wherein each tier associated with distinct value-based selection criteria, wherein the tier-specific inventory tracking structures enable independent inventory operations for each tier;

one or more processors configured to:

detect a purchase transaction for at least one salable item from a first tier of the inventory in a first tier of the plurality of product tiers;

in response to detecting the purchase transaction, automatically update inventory data for the first tier independently from inventory data of other tiers using tier-isolated data operations;

in response to the updated inventory data, determine acquisition probabilities salable items in the first tier based on the updated inventory data independently from acquisition probabilities for other tiers, wherein the acquisition probabilities are calculated based at least one of: current quantities of salable items within the first tier, historical transaction patterns, or target distribution rates; and transmit, via event-driven communication protocols that push inventory updates to client devices in response to detected inventory changes, the determined acquisition probabilities to a plurality of client devices for simultaneous display, wherein the one or more processors automatically transmit notifications of inventory changes to maintain real-time inventory synchronization across distributed client interfaces.

* * * * *